United States Patent
Oda et al.

(10) Patent No.: US 11,664,904 B2
(45) Date of Patent: May 30, 2023

(54) TRANSMISSION DEVICE AND METHOD OF SETTING TRANSMISSION PARAMETER

(71) Applicant: FUJITSU LIMITED, Kawasaki (JP)

(72) Inventors: Shoichiro Oda, Fuchu (JP); Daijiro Tanaka, Fuchu (JP); Kenji Ota, Ota (JP); Takafumi Kusumi, Edogawa (JP); Daiki Matsuyama, Tachikawa (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/515,584

(22) Filed: Nov. 1, 2021

(65) Prior Publication Data

US 2022/0224417 A1    Jul. 14, 2022

(30) Foreign Application Priority Data

Jan. 14, 2021    (JP) .............................. JP2021-003922

(51) Int. Cl.
*H04B 10/50* (2013.01)
*H04B 10/572* (2013.01)
(Continued)

(52) U.S. Cl.
CPC ......... *H04B 10/572* (2013.01); *H04B 10/294* (2013.01); *H04B 10/07* (2013.01);
(Continued)

(58) Field of Classification Search
CPC ................ H04B 10/572; H04B 10/294; H04B 10/2507; H04B 10/07953; H04B 10/07;
(Continued)

(56) References Cited

U.S. PATENT DOCUMENTS

| 7,382,985 B2* | 6/2008 | Roberts ............ H04B 10/25137 398/147 |
| 10,069,590 B1* | 9/2018 | Wang ............... H04B 10/25073 |

(Continued)

FOREIGN PATENT DOCUMENTS

JP    2019-161448 A    9/2019

OTHER PUBLICATIONS

Takeo Sasai et al., "Digital Backpropagation for Optical Path Monitoring: Loss Profile and Passband Narrowing Estimation", 2020 European Conference on Optical Communications [ECOC] IEEE, 2020 (Total 4 pages).

*Primary Examiner* — Dibson J Sanchez
(74) *Attorney, Agent, or Firm* — Fujitsu Patent Center

(57) ABSTRACT

A transmission device includes: a memory; and a processor coupled to the memory and configured to: transmit or receive an optical signal; filter an electrical electric field signal that indicates electric field information of the optical signal; calculate a transmission characteristic of filtering of the electric field signal and set the transmission characteristic in the filter on a basis of a narrowing amount of a wavelength band of the optical signal transmitted through a transmission line and a narrowing amount of the wavelength band when a state of the transmission line is changed on a basis of transmission line information regarding the transmission line of the optical signal; and set a transmission parameter of the optical signal according to quality of the electric field signal filtered by the filter.

14 Claims, 15 Drawing Sheets

(51) Int. Cl.
*H04B 10/294* (2013.01)
*H04J 14/02* (2006.01)
*H04B 10/07* (2013.01)
*H04B 10/58* (2013.01)

(52) U.S. Cl.
CPC .............. *H04B 10/50* (2013.01); *H04B 10/58* (2013.01); *H04J 14/02* (2013.01)

(58) Field of Classification Search
CPC ..... H04B 10/50; H04B 10/58; H04J 14/0212; H04J 14/02
USPC .................... 398/9–38, 43–103, 182–201
See application file for complete search history.

(56) References Cited

U.S. PATENT DOCUMENTS

| | | | |
|---|---|---|---|
| 2007/0140703 A1* | 6/2007 | Fells | H04B 10/58 398/159 |
| 2009/0196602 A1* | 8/2009 | Saunders | H04B 10/5055 398/9 |
| 2015/0037034 A1* | 2/2015 | Renaudier | H04B 10/508 398/79 |
| 2015/0104181 A1* | 4/2015 | Mazurczyk | H04B 10/5162 398/115 |
| 2015/0222360 A1* | 8/2015 | Boertjes | H04B 10/6161 398/208 |
| 2016/0164626 A1* | 6/2016 | Cavaliere | H04L 1/0006 398/183 |
| 2016/0277118 A1* | 9/2016 | Châtelain | H04B 10/25073 |
| 2017/0222716 A1* | 8/2017 | Nakashima | H04B 10/0795 |
| 2017/0244489 A1* | 8/2017 | Zhuge | H04B 10/588 |
| 2018/0175933 A1* | 6/2018 | Nomura | H04B 10/50 |
| 2018/0316438 A1* | 11/2018 | Kodama | H04J 14/0298 |
| 2019/0288775 A1 | 9/2019 | Maeda | |
| 2019/0326987 A1* | 10/2019 | Noguchi | H04J 14/0298 |
| 2020/0052794 A1* | 2/2020 | Noguchi | H04B 10/615 |
| 2020/0162172 A1* | 5/2020 | Sridhar | H04L 27/12 |
| 2022/0166534 A1* | 5/2022 | Noguchi | H04J 14/06 |

* cited by examiner

FIG. 5

| TRANSMISSION MODE | MODULATION METHOD | BAUD RATE (Gbaud) | FEC METHOD | TRANSMISSION CAPACITY (Gbps) | Q VALUE | Qlimit | Qmargin | TRANSMISSION AVAILABILITY |
|---|---|---|---|---|---|---|---|---|
| #1 | DP-QPSK | 50 | UFEC | 100 | 13.5 | 5.0 | 8.5 | TRANSMISSIBLE |
| #2 | DP-QPSK | 50 | GFEC | 100 | 13.5 | 5.5 | 8.0 | TRANSMISSIBLE |
| #3 | DP-16QAM | 50 | UFEC | 200 | 11.3 | 8.0 | 3.3 | TRANSMISSIBLE |
| #4 | DP-16QAM | 50 | GFEC | 200 | 11.3 | 8.5 | 2.8 | TRANSMISSIBLE |
| #5 | DP-32QAM | 50 | UFEC | 300 | 10.2 | 10.5 | -0.3 | UNTRANSMISSIBLE |
| #6 | DP-32QAM | 50 | GFEC | 300 | 10.2 | 11.0 | -0.8 | UNTRANSMISSIBLE |

TRANSMISSION DEVICE AND METHOD OF SETTING TRANSMISSION PARAMETER

CROSS-REFERENCE TO RELATED APPLICATION

This application is based upon and claims the benefit of priority of the prior Japanese Patent Application No. 2021-3922, filed on Jan. 14, 2021, the entire contents of which are incorporated herein by reference.

FIELD

The present case discussed herein is related to a transmission device and a method of setting a transmission parameter.

BACKGROUND

Examples of transmission parameters of an optical signal that affect transmission performance of a transmission device such as a transmission rate include a type of modulation method, a baud rate, and the like. When setting transmission parameters assuming the worst transmission state at the time of installation according to design values of optical components of the transmission device or the like, as an example, there is a possibility that the optical signal is transmitted at a low transmission rate anticipating an excessive margin for the original transmission performance of the transmission device. To cope with that, at the time of installation of the transmission device, for example, an optical signal-to-noise ratio (OSNR) is measured for each transmission rate, and the transmission parameter is set on the basis of a measurement value, whereby unnecessary margin can be reduced.

Japanese Laid-open Patent Publication No. 2019-161448 is disclosed as related art.

SUMMARY

According to an aspect of the embodiments, a transmission device includes: a memory; and a processor coupled to the memory and configured to: transmit or receive an optical signal; filter an electrical electric field signal that indicates electric field information of the optical signal; calculate a transmission characteristic of filtering of the electric field signal and set the transmission characteristic in the filter on a basis of a narrowing amount of a wavelength band of the optical signal transmitted through a transmission line and a narrowing amount of the wavelength band when a state of the transmission line is changed on a basis of transmission line information regarding the transmission line of the optical signal; and set a transmission parameter of the optical signal according to quality of the electric field signal filtered by the filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a transmission mode;

DESCRIPTION OF EMBODIMENTS

For example, regarding a wavelength division multiplex (WDM) network, a technique of calculating a bandwidth and an OSNR that satisfy predetermined quality for each multi-level modulation method for an optical signal and registered the bandwidth and the OSNR in a database, and selecting an optimum multi-level modulation method on the basis of the database is disclosed.

A wavelength selective switch (WSS) is provided on a transmission line in the WDM network, which multiplexes or separates a plurality of optical signals having different wavelengths. The wavelength selective switch includes an optical filter that transmits or blocks the optical signal for each wavelength. A transmission band of the optical filter changes depending on whether a channel assigned to each optical signal is used.

Therefore, in a case where a channel of another optical signal having an adjacent wavelength is unused, the transmission band of the optical filter corresponding to the unused channel is blocked, so the transmission band is narrowed. Therefore, an influence of pass band narrowing (PBN) caused as the optical signal passes through the optical filter increases. Furthermore, since the higher the baud rate of the optical signal, the wider the wavelength bandwidth (spectrum) of the optical signal, the influence of pass band narrowing (PBN) by the optical filter increases.

Therefore, in a case where the transmission parameter of the optical signal is set on the basis of a band narrowing amount at the time of installation of the transmission device, there is a possibility that the transmission quality will deteriorate in the future due to an increase in the band narrowing amount according to a change in channel settings. To cope with that, if the transmission parameter is set in consideration of the further increase in the band narrowing amount according to design values of, for example, optical components of the transmission device and the transmission line, the deterioration of the transmission quality due to the increase in the band narrowing amount can be suppressed. However, in this case, since an excessive margin is expected for the original transmission performance of the transmission device as described above, there is a possibility of a decrease in the transmission rate, or the like.

Therefore, the present case is intended to provide a transmission device capable of transmitting an optical signal on the basis of an appropriate transmission parameter according to a further band narrowing of the optical signal, and a method of setting a transmission parameter.

(Band Narrowing)

Figure 1:
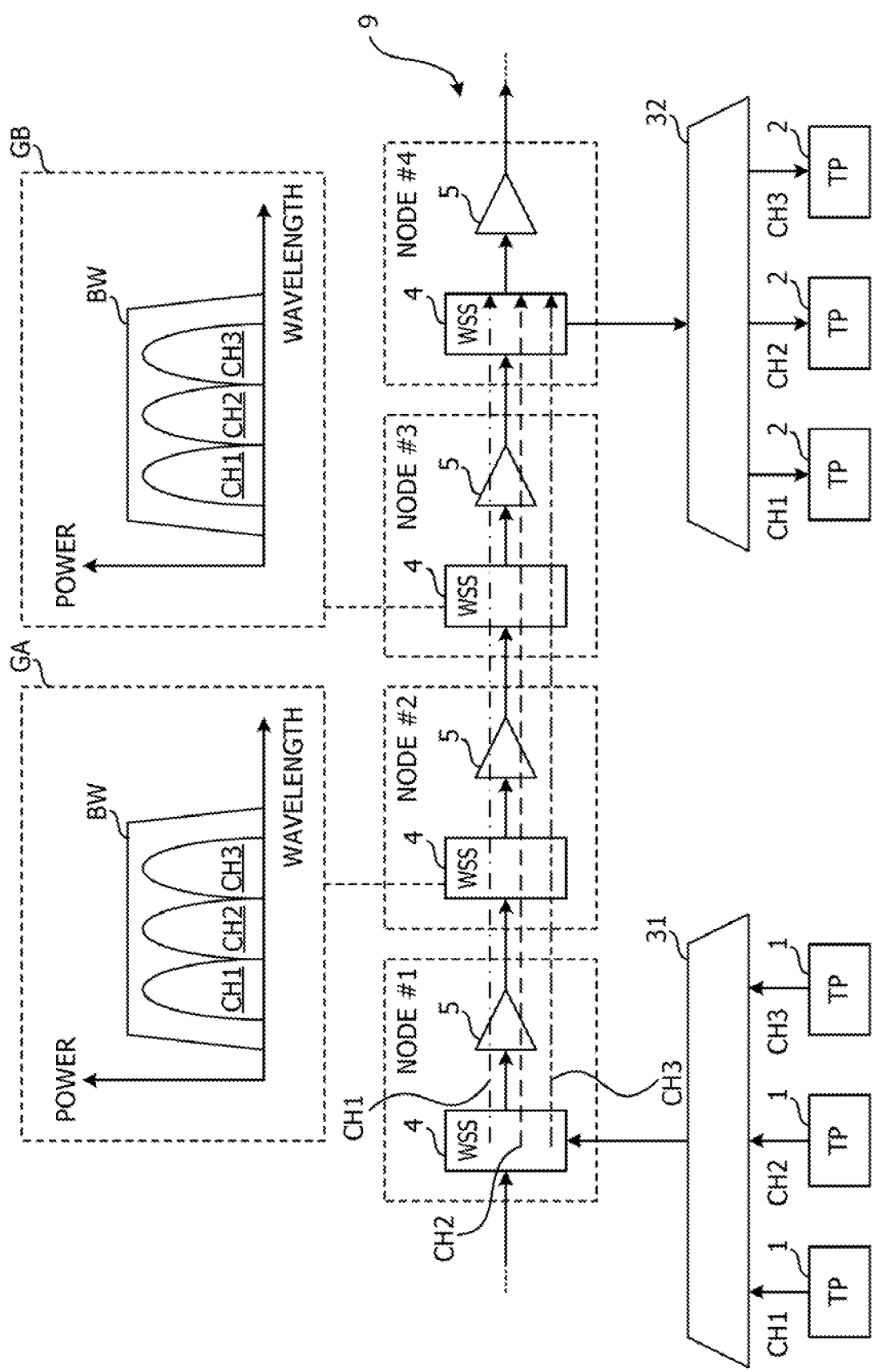
FIG. 1 is a diagram illustrating an example of optical signal transmission processing in a case where there is no band narrowing.

FIG. 1 is a diagram illustrating an example of optical signal transmission processing in a case where there is no band narrowing. A transmission line 9 is provided with nodes #1 to #4 each including a wavelength selective switch (WSS) 4 and an optical amplifier 5 as an example. The nodes #1 to #4 are connected to one another by an optical fiber or the like.

As an example, a case where respective optical signals of three channels (CH1 to CH3) are wavelength-multiplexed and transmitted from the node #1 to the node #4 on the transmission line 9 will be described. Central wavelengths (hereinafter simply referred to as wavelengths) of the respective optical signals of CH1 to CH3 are different, and spectra of the respective optical signals have an adjacent relationship with one another. The central wavelength of the optical signal of CH1 is set on a short wavelength side of the central wavelength of the optical signal of CH2, and the central wavelength of the optical signal of CH3 is set on a long wavelength side of the central wavelength of the optical signal of CH2.

Transponders (TPs) 1 that transmit the respective optical signals of CH1 to CH3 and a multiplexer 31 that wavelength-multiplexes the respective optical signals are connected to the node #1. The multiplexer 31 includes, for example, an optical component such as an optical coupler, and wavelength-multiplexes the respective optical signals of CH1 to CH3 input from the respective TPs 1 and outputs the optical signals as a wavelength multiplexed optical signal to the WSS 4 of the node #1.

Transponders (TPs) 2 that receive the respective optical signals of CH1 to CH3 and a demultiplexer 32 that demultiplexes the respective optical signals for each wavelength are connected to the node #4. The demultiplexer 32 includes, for example, optical components such as an optical splitter and an optical filter, and demultiplexes the respective optical signals of CH1 to CH3 input from the WSS 4 of the node #4 from the wavelength multiplexed optical signal for each wavelength and outputs the optical signal to each TP 2.

The WSS 4 transmits or blocks the optical signal for each wavelength corresponding to each of CH1 to CH3. The optical signal transmitted through the WSS 4 is amplified by the optical amplifier 5. Since the respective optical signals of CH1 to CH3 in the present example are transmitted from the node #1 to the node #4, each WSS 4 of the nodes #1 to #4 is set to transmit the optical signals of CH1 to CH3.

Code GA represents an example of power for the wavelength of the optical signal passing through the WSS 4 of the node #2, and code GB represents an example of power for the wavelength of the optical signal passing through the WSS 4 of the node #3. A transmission band BW of the WSS 4 is generated by synthesizing wavelength bands corresponding to the central wavelengths of the optical signals of CH1 to CH3.

Therefore, the transmission band BW of the WSS 4 is sufficiently wide with respect to the wavelength band of the optical signal of each of CH1 to CH3. Therefore, the band narrowing of the optical signal of each of CH1 to CH3 does not substantially occur.

Figure 2:
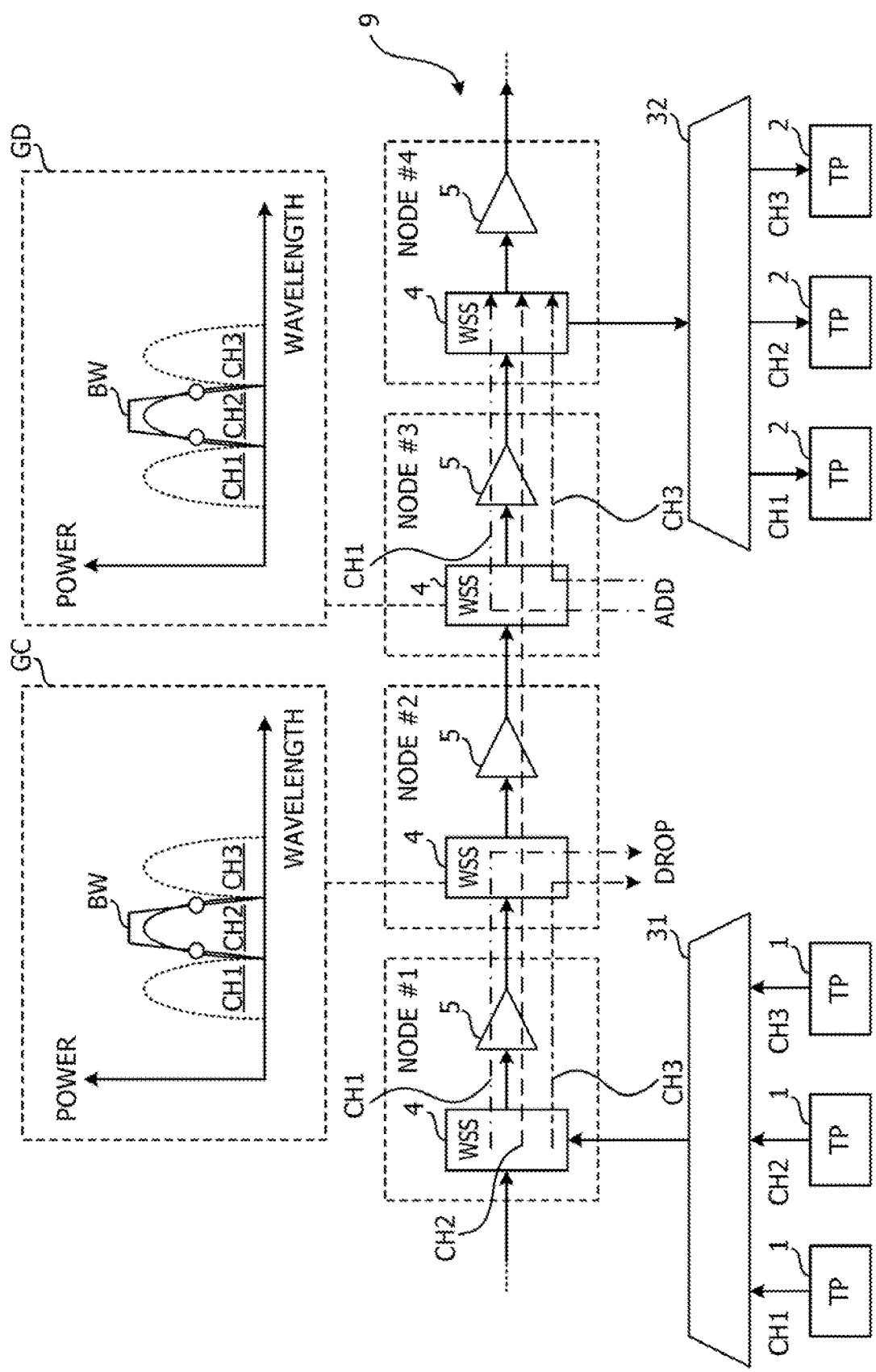
FIG. 2 is a diagram illustrating an example of optical signal transmission processing in a case where there is band narrowing.

FIG. 2 is a diagram illustrating an example of optical signal transmission processing in a case where there is band narrowing. In FIG. 2, the same components as those in FIG. 1 are denoted by the same codes, and description thereof will be omitted.

The optical signal of CH1 in the present example is branched (DROP) at the node #2 and inserted (ADD) at the node #3. Furthermore, the optical signal of CH3 in the present example is branched at the node #2 and inserted at the node #3. Note that illustration of the TPs that branch and insert the optical signals at the nodes #2 and #3 are omitted.

Code GC represents an example of power for the wavelength of the optical signal passing through the WSS 4 of the node #2. Since the optical signals of CH1 and CH3 are not output from the node #2, the WSS 4 of the node #2 is set to block the wavelength bands of the optical signals of CH1 and CH3 on an outlet side as illustrated by the dotted line. Therefore, the transmission band BW of the WSS4 is a narrow band corresponding to the wavelength band of the CH2. Therefore, an end portion of the wavelength band of CH2 is scraped by the transmission band BW of the WSS 4 on the outlet side of the node #2, and the band narrowing occurs (see the circle mark).

Code GD represents an example of power for the wavelength of the optical signal passing through the WSS 4 of the node #3. Since the optical signals of CH1 and CH3 are not input to the node #3, the WSS 4 of the node #3 is set to block the wavelength bands of the optical signals of CH1 and CH3 on an inlet side as illustrated by the dotted line. Therefore, the transmission band BW of the WSS4 is a narrow band corresponding to the wavelength band of the CH2. Therefore, an end portion of the wavelength band of CH2 is scraped by the transmission band BW of the WSS 4 on the inlet side of the node #3, and the band narrowing occurs (see the circle mark).

Figure 3:
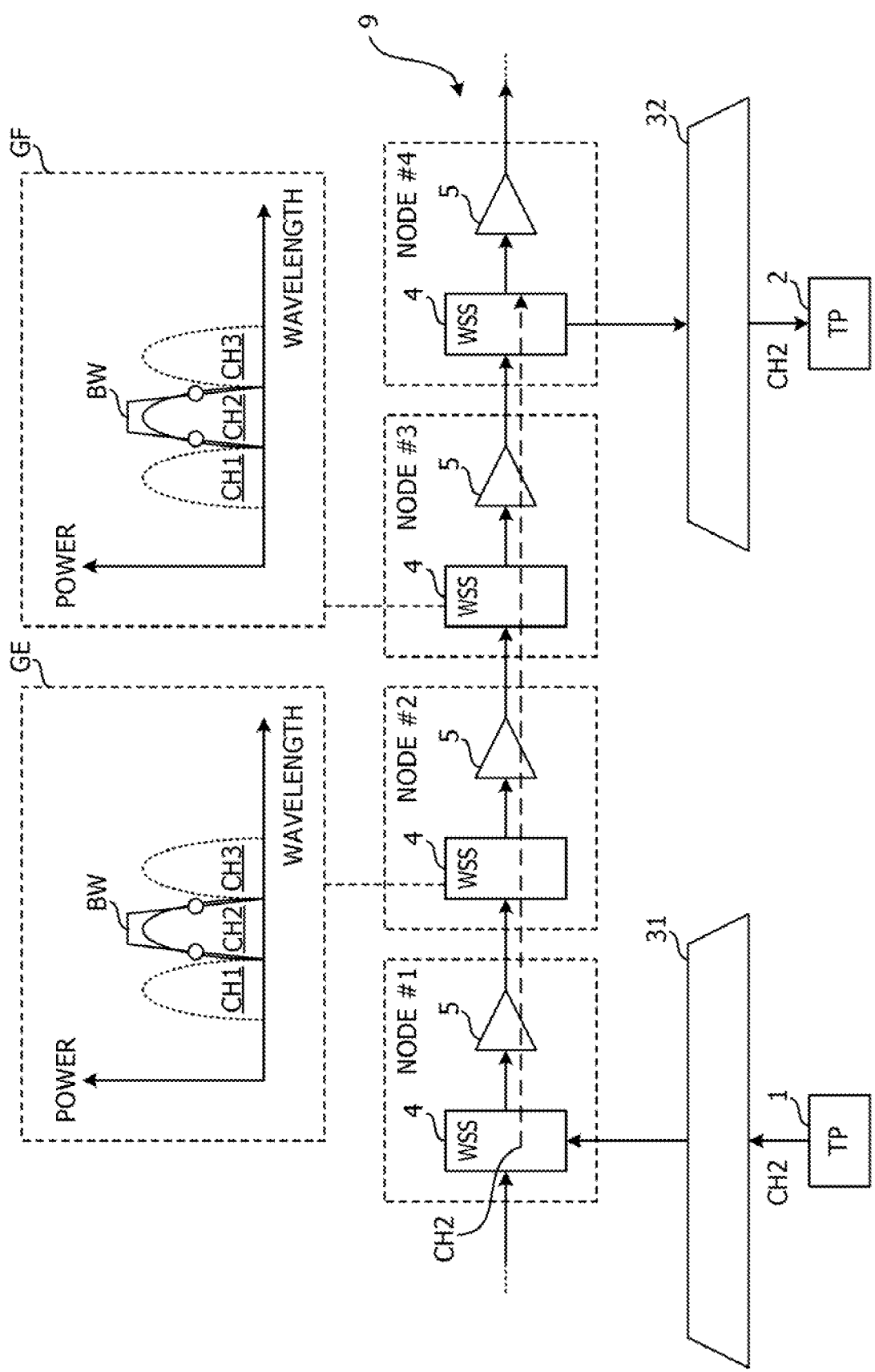
FIG. 3 is a diagram illustrating another example of optical signal transmission processing in the case where there is band narrowing.

FIG. 3 is a diagram illustrating another example of optical signal transmission processing in the case where there is band narrowing. In FIG. 3, components common to those in FIG. 1 are denoted by the same codes, and description thereof will be omitted.

In the present example, a case of not using the TPs 1 and 2 that transmit and receive the optical signals of CH1 and CH3 and transmitting only the optical signal of CH2 to the transmission line 9 will be described. The optical signal of CH2 is transmitted in the transmission line 9 from the node #1 to the node #4.

Code GE represents an example of power for the wavelength of the optical signal passing through the WSS 4 of the node #2, and code GF represents an example of power for the wavelength of the optical signal passing through the WSS 4 of the node #3. Each WSS 4 is set to block the wavelength bands of the optical signals of unused CH1 and CH3 in order to suppress transmission of amplified spontaneous emission (ASE) light through the transmission line 9, the ASE being generated as noise from the optical amplifier 5.

Therefore, the transmission band BW of the WSS4 is a narrow band corresponding to the wavelength band of the CH2. Therefore, an end portion of the wavelength band of CH2 is scraped by the transmission band BW of the WSS 4 at the nodes #2 and #3, and the band narrowing occurs (see the circle marks).

For example, consider a case when the TPs 1 and 2 that transmit and receive the optical signal of CH2 are installed, the transmission rate of the optical signal is set on the basis of the band narrowing amount of the optical signal of CH2 in the state of the transmission line 9 illustrated in FIG. 1. In this case, when the transmission line 9 becomes the state illustrated in FIG. 2 or 3 due to a change in the channel settings in the future, the transmission quality may deteriorate due to an increase in the band narrowing amount.

To cope with that, if transmission parameters are set in consideration of a further increase in the band narrowing amount according to design values of optical components of the TPs 1 and 2, WSS 4, optical amplifier 5, and the like, deterioration of the transmission quality due to the increase in the band narrowing amount can be suppressed. However, in this case, an excessive margin is expected for the original transmission performance of the TPs 1 and 2, there is a possibility of a decrease in the transmission rate, for example.

Therefore, for the TPs 1 and 2, appropriate transmission parameters according to the future band narrowing of the optical signal are set by pseudo-generating the increase in the future band narrowing amount.

First Embodiment

Figure 4:
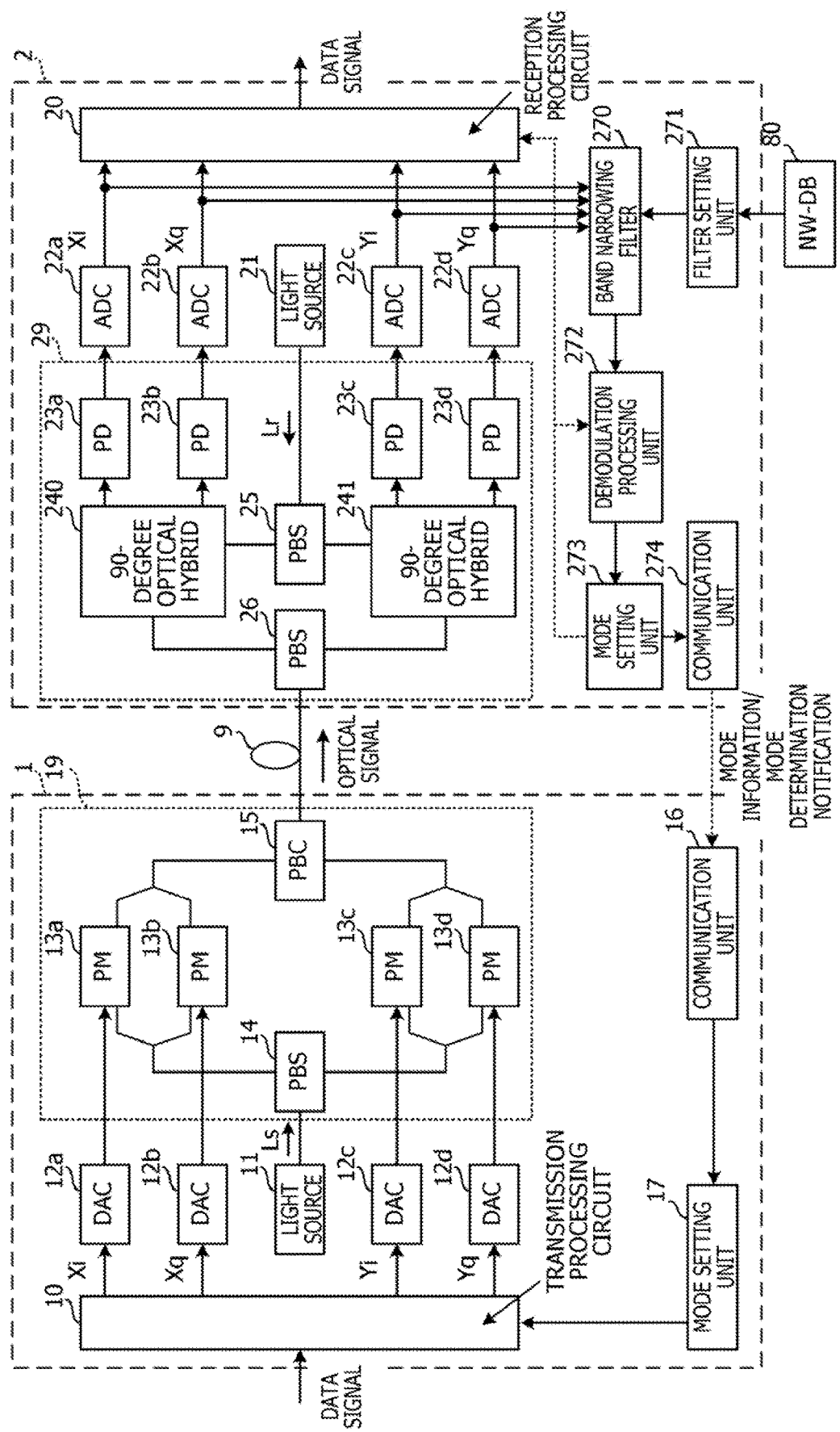
FIG. 4 is a configuration diagram illustrating transponders according to a first embodiment.

FIG. 4 is a configuration diagram illustrating the TPs 1 and 2 of the first embodiment. The TPs 1 and 2 are examples of transmission devices, and transmit and receive optical signals according to a digital coherent optical transmission method. The TP 1 transmits an optical signal to the transmission line 9, and the TP 2 receives an optical signal So from the TP 1 via the transmission line 9. Note that the multiplexer 31, the demultiplexer 32, and the nodes #1 to #4 are not illustrated.

The TP 1 generates an optical signal in which X polarization and Y polarization orthogonal to each other are combined from a data signal such as an Ethernet (registered trademark) signal. The TP 1 includes a transmission processing circuit 10, a light source 11, digital-to-analog converters (DACs) 12a to 12d, a mode setting unit 17, a communication unit 16, and an optical transmission unit 19. The optical transmission unit 19 includes phase modulators (PMs) 13a to 13d, a polarization beam splitter (PBS) 14, and a polarization beam combiner (PBC) 15. The optical transmission unit 19 transmits the optical signal to the TP 2 via the transmission line 9.

The transmission processing circuit 10 generates electric field signals Xi, Xq, Yi, and Yq by modulating a data signal input from another device by a multi-level modulation method (hereinafter referred to as a modulation method) such as 64 quadrature amplitude modulation (QAM) and outputs the generated electric field signals Xi, Xq, Yi, and Yq to the DACs 12a to 12d, respectively. The electric field signals Xi, Xq, Yi, and Yq indicate electric field information of the optical signal. The electric field signals Xi and Xq are I and Q components of the X polarization of the optical signal, and the electric field signals Yi and Yq are I and Q components of the Y polarization of the optical signal. Note that an example of the transmission processing circuit 10 includes, for example, a digital signal processor (DSP) but is not limited to this example, and may be, for example, a field programmable gate array (FPGA) or an application specific integrated circuit (ASIC).

Furthermore, the transmission processing circuit 10 generates, for example, a forward error correction (FEC) code as an error correction code in order to correct a data error in the data signal and assigns the code to the data signal. The transmission processing circuit 10 modulates the data signal and the FEC code to generate the electric field signals Xi, Xq, Yi, and Yq.

The mode setting unit 17 sets a transmission mode of the optical signal for the transmission processing circuit 10. The transmission mode is defined by a modulation method, a baud rate (Gbaud), and a FEC method, as will be described below. The communication unit 16 acquires mode information from the TP 2 and outputs the mode information to the mode setting unit 17. The mode setting unit 17 sets the transmission mode indicated by the mode information in the transmission processing circuit 10.

Furthermore, in a case where the TP 2 determines the transmission mode to be used during operation, the mode setting unit 17 receives a mode determination notification from the TP 2. The mode setting unit 17 sets the transmission mode during operation indicated by the mode determination notification in the transmission processing circuit 10. Note that the mode setting unit 17 and the communication unit 16 may be implemented by a circuit such as a DSP, an FPGA, or an ASIC, or may be implemented as functions of a processor such as a central processing unit (CPU) that operates by a program.

The DACs 12a to 12d convert the electric field signals Xi, Xq, Yi, and Yq from digital signals to analog signals, respectively. The electric field signals Xi, Xq, Yi, and Yq are input to the PMs 13a to 13d, respectively. Note that the DACs 12a to 12d may be provided in the transmission processing circuit 10.

The light source 11 is, for example, a laser diode (LD) and outputs transmission light Ls having a predetermined frequency to the PBS 14. The PBS 14 separates light S into polarization components on an X-axis and a Y-axis (polarization axis). The X polarization component of the transmission light Ls is input to the PMs 13a and 13b and the Y polarization component of the transmission light Ls is input to the PMs 13c and 13d.

The PMs 13a to 13d optically modulate the transmission light Ls by the electric field signals Xi, Xq, Yi, and Yq converted into analog signals. More specifically, the PMs 13a and 13b phase-modulate the X polarization of the transmission light Ls on the basis of the electric field signals Xi and Xq, and the PM 13c and 13d phase-modulate the Y polarization of the transmission light Ls on the basis of the electric field signals Yi and Yq. The X polarization component and the Y polarization component of the phase-modulated transmission light Ls are input to the PBC 15. The PBC 15 combines the X polarization component and the Y polarization component of the transmission light Ls and outputs a combined signal as an optical signal to the transmission line 9.

The TP 2 includes a reception processing circuit 20, a light source 21, analog-to-digital convertors (ADCs) 22a to 22d, and an optical reception unit 29. The optical reception unit 29 is an example of a transmission/reception unit that receives an optical signal from the transmission-side TP 1 via the transmission line 9. The optical reception unit 29 corresponds to an optical front end, includes a photodiodes (PDs) 23a to 23d, 90-degree optical hybrid circuits 240 and 241, and PBSs 25 and 26, and receives the optical signal from the transmission line 9. The PBS 26 separates the optical signal input from the TP 1 via the transmission line 9 into the X polarization component and the Y polarization component, and outputs the polarization components to the 90-degree optical hybrid circuits 240 and 241, respectively.

Furthermore, the light source 21 inputs local light emission Lr to the PBS 25. The PBS 25 separates the local light emission Lr into the X polarization component and the Y polarization component, and outputs the polarization components to the 90-degree optical hybrid circuits 240 and 241, respectively.

The 90-degree optical hybrid circuit 240 detects the X polarization component of the optical signal by a waveguide that interferes with the X polarization component of the optical signal and the X polarization component of the local light emission Lr. The 90-degree optical hybrid circuit 240 outputs optical electric field components corresponding to the amplitude and phase of the I channel and the Q channel to the PDs 23a and 23b, respectively, as a detection result.

The 90-degree optical hybrid circuit 241 detects the Y polarization component of the optical signal by a waveguide that interferes with the Y polarization component of the optical signal and the Y polarization component of the local light emission Lr. The 90-degree optical hybrid circuit 241 outputs optical electric field components corresponding to the amplitude and phase of the I channel and the Q channel to the PDs 23c and 23d, respectively, as a detection result.

The PDs 23a to 23d convert the optical electric field components into electrical signals and output the electrical signals to the ADCs 22a to 22d, respectively. The ADCs 22a to 22d convert the electrical signals input from the PDs 23a to 23d into electric field signals Xi, Xq, Yi, and Yq, respectively. The electric field signals Xi, Xq, Yi, and Yq are input to the reception processing circuit 20.

The reception processing circuit 20 compensates the electric field signals Xi, Xq, Yi, and Yq for waveform distortion generated in the optical signal due to polarization mode dispersion and polarization dependence loss in the transmission line 9 on the basis of dynamic parameters, and performs demodulation processing for the electric field signals Xi, Xq, Yi, and Yq to restore the data signal. Furthermore, the reception processing circuit 20 performs error correction processing for the data signal according to the FEC code assigned to the data signal. Note that an example of the reception processing circuit 20 includes, for example, a DSP, but is not limited to this, and may be, for example, an FPGA or an ASIC.

Furthermore, the TP 2 further includes a band narrowing filter 270, a filter setting unit 271, a demodulation processing unit 272, a mode setting unit 273, and a communication unit 274. The band narrowing filter 270, the filter setting unit 271, the demodulation processing unit 272, the mode setting unit 273, and the communication unit 274 may be implemented by a circuit such as a DSP, an FPGA, or an ASIC, or may be implemented as functions of a processor such as a CPU that operates by a program.

The electric field signals Xi, Xq, Yi, and Yq are branched in the middle of the transmission line from the ADCs 22a to 22d to the reception processing circuit 20 and input to the band narrowing filter 270.

The band narrowing filter 270 is an example of a filter and filters the electric field signals Xi, Xq, Yi, and Yq. The band narrowing filter 270 has filtering characteristics set by the filter setting unit 271, and functions as an emulator that pseudo-generates future band narrowing for the electric field signals Xi, Xq, Yi, and Yq. The electric field signals Xi, Xq, Yi, and Yq pass through the band narrowing filter 270 and are input to the demodulation processing unit 272.

The demodulation processing unit 272 restores the data signal similarly to the reception processing circuit 20 by performing demodulation processing for the electric field signals Xi, Xq, Yi, and Yq. The data signal is input to the mode setting unit 273.

The mode setting unit 273 is an example of a parameter setting unit, and sets the transmission mode of the optical signal according to the quality of the electric field signals Xi, Xq, Yi, and Yq filtered by the filter. For example, the mode setting unit 273 calculates an error rate of the optical signal from the demodulated electric field signals Xi, Xq, Yi, and Yq, and calculates a Q value on the basis of the error rate. Here, the Q value is an example of the quality of the electric field signals Xi, Xq, Yi, and Yq.

The mode setting unit 273 selects a transmission mode in which the Q value satisfies a predetermined condition from a plurality of transmission modes having different modulation methods and FEC methods. The mode setting unit 273 sets the selected transmission mode in the reception processing circuit 20 and the demodulation processing unit 272.

FIG. 5 is a diagram illustrating an example of a transmission mode. As an example, transmission modes #1 to #6 are defined by the type of modulation method, the baud rate (Gbaud), and the type of FEC method. Here, the type of modulation method, the baud rate, and the type of FEC method are examples of transmission parameters that affect the performance of the transmission device. Furthermore, the transmission modes #1 to #6 are examples of a plurality of candidates for the transmission parameters.

The modulation method of transmission modes #1 and #2 is dual polarization (DP)-quadrature phase shift keying (QPSK), the modulation method of transmission modes #3 and #4 is DP-16QAM, and the modulation methods of transmission modes #5 and #6 is DP-32QAM. The baud rate of the transmission modes #1 to #6 is 50 (Gbaud) in common. Note that the baud rates of the transmission modes #1 to #5 may be different from one another.

Therefore, the transmission capacity of the transmission modes #1 and #2 is 100 (Gbps), the transmission capacity of the transmission modes #3 and #4 is 200 (Gbps), and the transmission capacity of the transmission modes #5 and #6 is 300 (Gbps). Therefore, the mode setting unit 273 can set the transmission rate of the optical signal during operation by selecting the transmission modes #1 to #6. Furthermore, the FEC method of transmission modes #1, #3, and #5 is Ultra FEC (UFEC), and the FEC method of transmission modes #2, #4, and #5 is general FEC (GFEC). The error correction capability of the TP 2 depends on the FEC method.

The mode setting unit 273 compares, for each transmission mode, the Q value with an error correction threshold value Qlimit according to the FEC method, and determines transmission availability according to a comparison result. The error correction threshold value Qlimit is an example of the deterioration amount in the quality of the electric field signals due to an error correction limit of the electric field signals Xi, Xq, Yi, and Yq. For example, the mode setting unit 273 calculates a quality margin amount Qmargin (=Q value−Qlimit), which is a difference between the Q value and the error correction threshold value Qlimit, and determines the transmission mode that satisfies Qmargin≤0 to be transmissible (see "transmissible") or determines the transmission mode that satisfies Qmargin<0 to be untransmissible (see "untransmissible"). Note that Qmargin≥0 is an example of the predetermined condition regarding the quality of the electric field signals Xi, Xq, Yi, and Yq.

FIG. 5 illustrates the Q value, the error correction threshold value Qlimit, the quality margin amount Qmargin, and the determination example for the transmission availability, for each of the transmission modes #1 to #6 In the present example, the transmission modes #1 to #4 are determined to be transmissible because the quality margin amount Qmargin is larger than 0, and the transmission modes #5 and #6 are determined to be untransmissible because the quality margin amount Qmargin is smaller than 0.

Therefore, the mode setting unit 273 determines the transmission mode used for transmitting the optical signal during operation from the transmission modes #1 to #4. In this way, since the mode setting unit 273 sets the transmission parameter on the basis of the comparison result of the Q value and the error correction threshold value Qlimit, and can use an appropriate transmission mode according to the error correction capability of the TP 2.

The mode setting unit 273 selects the transmission mode #4 having the maximum transmission rate from the transmission modes #1 to #4 satisfying Qmargin ≥0 (see the dotted-line circle mark). This secures the maximum transmission capacity. Note that the mode setting unit 273 may select the transmission mode #3 having the same transmission rate as the transmission mode #4. In the case where there is a plurality of transmission modes having the maximum rate satisfying Qmargin ≥0, the mode setting unit 273 selects the transmission mode on the basis of another criterion such as frequency utilization efficiency of the optical signal or power consumption of the TP 2, for example.

Referring to FIG. 4 again, the mode setting unit 273 outputs the mode information indicating the selected transmission mode to the communication unit 274. Furthermore, the mode setting unit 273 outputs a mode determination notification indicating the finally determined transmission mode to the communication unit 274.

The communication unit 274 communicates with the communication unit 16 of the TP 1 by a communication method such as frequency shift keying in-band supervisory (FSK-SV), for example. The communication unit 274 transmits the mode information and the mode determination notification to the communication unit 16 of the TP 1. As a result, the TPs 1 and 2 are set to the same transmission mode. Note that the mode information and the mode determination notification may be included in the optical signal in an opposite direction transmitted from the TP 2 to the TP 1.

The filter setting unit 271 sets the transmission characteristic of filtering according to a maximum increase in the future band narrowing amount in the band narrowing filter 270. The filter setting unit 271 acquires transmission line information regarding the transmission line 9 of the optical signal by accessing a network database (NW-DB) 80 outside the TP 2, for example. The filter setting unit 271 calculates the transmission characteristic of filtering on the basis of the transmission line information and sets the transmission characteristic in the band narrowing filter 270. Note that the NW-DB 80 may be provided in the TP 2.

For example, the transmission line information includes the number of WSSs 4 of the nodes #1 to #4 on the transmission line 9 as illustrated in FIG. 1, and the parameters of the transmission characteristics of filtering of the optical signals by the WSSs 4 in the nodes #1 to #4. The filter setting unit 271 calculates a difference (hereinafter described as difference narrowing amount) between a narrowing amount of the wavelength band of the optical signal at the installation of the TP 2 and a narrowing amount of when the state of the transmission line 9 is changed in the future on the basis of the NW-DB 80. Note that, in the following example, the difference narrowing amount is calculated from the maximum narrowing amount of when the state of the transmission line 9 is changed. However, the calculation method is not limited thereto, and the difference narrowing amount may be calculated from a narrowing amount less than the maximum narrowing amount of when the state of the transmission line 9 is changed.

For example, a case in which the state of the transmission line 9 at the installation of the TP 2 is the state illustrated in FIG. 1 and the future state of the transmission line 9 where the narrowing amount of the wavelength band of the optical signal is maximized is the state illustrated in FIG. 2 can be exemplified. In the state of the transmission line 9 illustrated in FIG. 1, the narrowing of the wavelength band of the optical signal of CH2 does not substantially occur as described above. Meanwhile, in the state of the transmission line 9 illustrated in FIG. 2, the wavelength band of the optical signal of CH2 is scraped from the short wavelength side (CH1 side) and the long wavelength side (CH3 side) in the WSSs 4 of the nodes #2 and #3.

Therefore, the filter setting unit 271 calculates the number of WSSs 4 (hereinafter referred to as the number of passages) "4" (=2×2 nodes) through which the optical signal of CH2 has passed with band narrowing as the difference narrowing amount. The filter setting unit 271 acquires a spectrum shape Twss (F) of the optical signal that has passed through the WSS 4 as the transmission characteristic of filtering of the WSS 4 from the NW-DB80, and calculates a spectrum shape Twss'(F) (={Twss(F)}$^4$) of the optical signal that has passed through the four WSSs 4 from the spectrum shape Twss (F). Note that this similarly applies to the case where the future state of the transmission line 9 in which the narrowing amount of the wavelength band of the optical signal is maximized is the state illustrated in FIG. 3.

As described above, since the transmission line information includes the number of WSSs 4 of the nodes #1 to #4 on the transmission line 9 and the parameters of the transmission characteristic of filtering of the optical signal by the WSSs 4 in the nodes #1 to #4, the filter setting unit 271 can easily calculate the difference narrowing amount.

Figure 6:
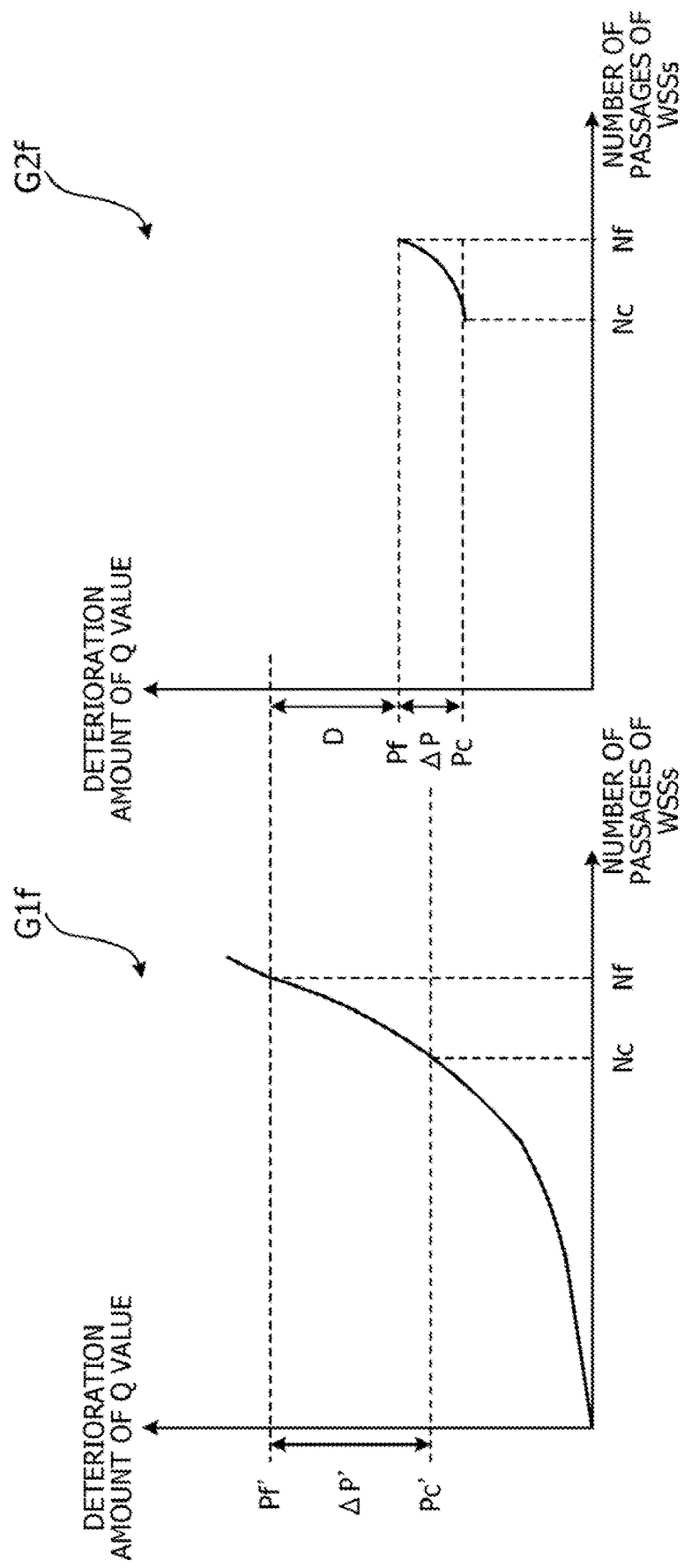
FIG. 6 is a graph illustrating an example of a relationship between the number of passages of a wavelength selective switch and a deterioration amount of a Q value.

FIG. 6 is a graph illustrating an example of a relationship between the number of passages of the WSSs 4 (see "number of passages of WSSs") and the deterioration amount of the Q value. Unlike the embodiment, code G1f represents a graph of the deterioration amount of the Q value calculated from the design values of, for example, the optical components of the TPs 1 and 2, and code G2f represents a graph of the deterioration amount of the Q value measured from the optical signal transmitted through the transmission line 9 in the embodiment. Nc is the number of passages of the WSSs of the optical signal at the installation of the TP 2, and Nf represents the number of passages of WSSs of the optical signal of when the narrowing amount of the wavelength band of the optical signal is maximized.

As the number of passages of WSSs increases, the band narrowing amount of the optical signal is accumulated. Therefore, the deterioration amount of the Q value increases. In the graph of code G1f, a deterioration amount Pf' of the Q value when the number of passages of WSSs is Nf is larger by AP' than a deterioration amount Pc' of the Q value when the number of passages of WSSs is Nc. Furthermore, in the graph of code G2f, a deterioration amount Pf of the Q value when the number of passages of WSSs is Nf is larger by AP than a deterioration amount Pc of the Q value when the number of passages of WSSs is Nc.

Since the deterioration amount of the Q value illustrated in the graph of code G1$f$ is a value based on the design values of the optical components, and the like, the deterioration amount is a value with low accuracy anticipating an excessive margin for the original transmission performance of the TPs 1 and 2. In contrast, the deterioration amount of the Q value illustrated in the graph of code G2$f$ is a value with high accuracy measured from the optical signal actually transmitted through the transmission line 9 without anticipating the excessive margin. Therefore, the deterioration amounts Pf and Pc of the Q value illustrated in the graph of code G2$f$ are smaller than the deterioration amounts Pf' and Pc' of the Q value illustrated in the graph of code G1$f$ and a difference AP is also smaller than AP'.

The mode setting unit 273 calculates a difference (Nf−Nc) of the numbers of passages of WSSs Nc and Nf from the transmission line information of the NW-DB 80 as the difference narrowing amount, calculates the transmission characteristic of filtering corresponding to the difference AP of the deterioration amounts Pc and Pf of the Q value according to the numbers of passages of WSSs Nc and Nf, and sets the transmission characteristic in the band narrowing filter 270. As a result, the band narrowing filter 270 can provide the difference AP of the deterioration amount of the Q value to the optical signal with high accuracy so that the maximum band narrowing occurs when the state of the transmission line 9 is changed.

Therefore, the mode setting unit 273 can select an appropriate transmission mode from the Q values of the electric field signals Xi, Xq, Yi, and Yq in which the maximum band narrowing is pseudo-generated with high accuracy by the band narrowing filter 270. Between the deterioration amount of the Q value illustrated in the graph of code G1$f$ and the deterioration amount of the Q value illustrated in the graph of code G2$f$, a difference in accuracy corresponding to the difference D between the deterioration amounts Pf and Pf' of the Q value corresponding to the maximum band narrowing is present. According to this difference in accuracy, the transmission rate can be improved as follows, for example.

For example, in the case of selecting the transmission mode using the deterioration amount of the Q value illustrated in the graph of code G1$f$, and when the transmission modes #5 and #6 of 300 (Gbps) are determined to be untransmissible, and the transmission modes #3 and #4 of 200 (Gbps) are determined to be transmissible, the transmission modes #3 and #4 of 200 (Gbps) are selected. Meanwhile, as in the embodiment, in the case of selecting the transmission mode using the deterioration amount of the Q value illustrated in the graph of code G2$f$, the transmission modes #3 and #4 of 200 (Gbps) are selected as the transmission modes #5 and #6 of 300 (Gbps) are determined to be untransmissible. Therefore, the transmission rate can be improved about 1.5 times.

In the present example, the transmission characteristic of filtering that causes the maximum band narrowing in the optical signal is set in the band narrowing filter 270, but the present example is not limited to the case. For example, the transmission characteristic of filtering that causes less than the maximum band narrowing according to a change in a state of the transmission line 9 may be set to the band narrowing filter 270, assuming the change in the state that occurs during a predetermined period from the time of setting the TP 2.

Figure 7:
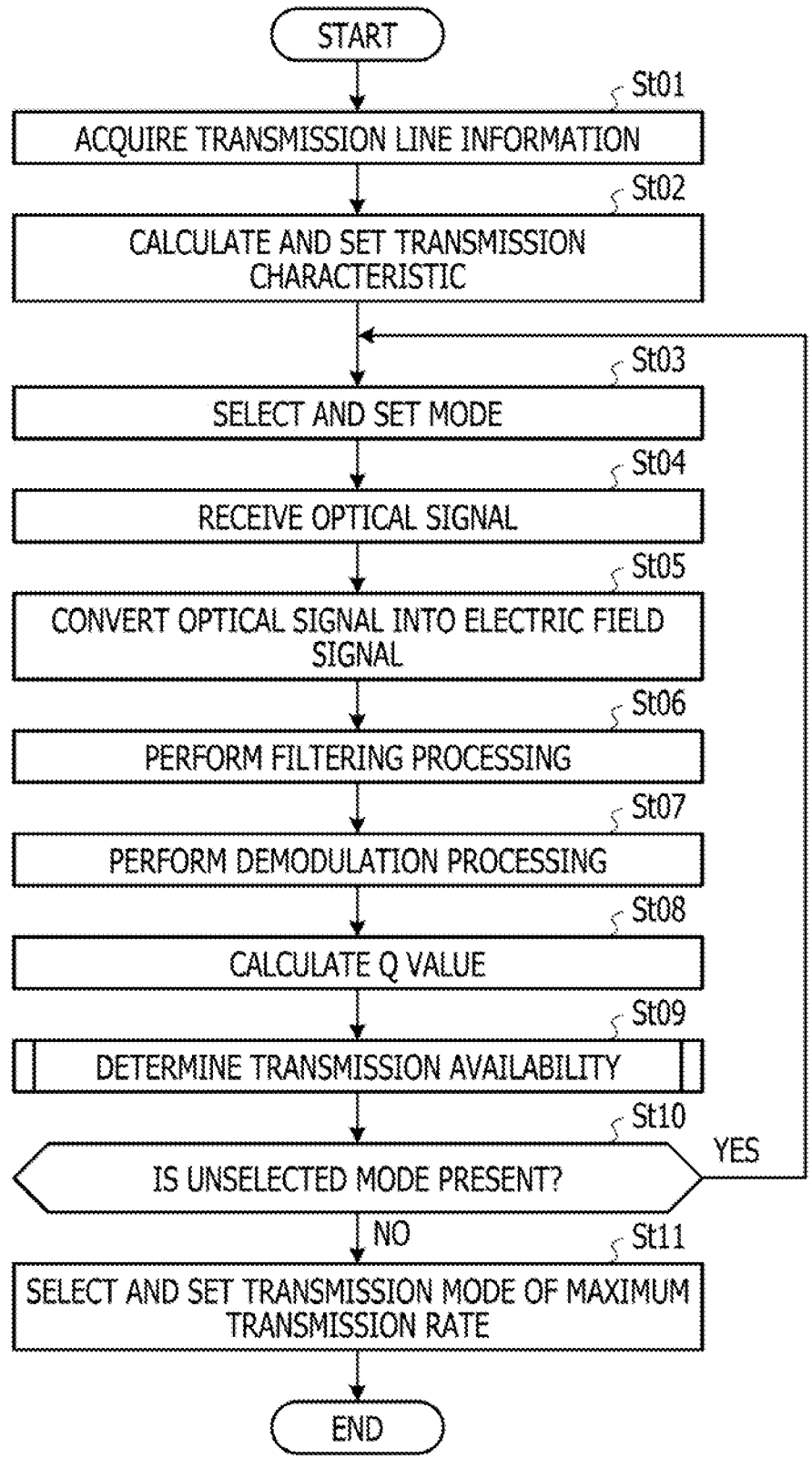
FIG. 7 is a flowchart illustrating a method of setting a transmission parameter of the first embodiment.

FIG. 7 is a flowchart illustrating a method of setting a transmission mode of the first embodiment. The transmission mode setting method is executed by the TP 2 at the installation of the device, for example, but is not limited to the case, and may be executed at the time of resetting of the transmission modes #1 to #6 with the change in the transmission line 9, for example. Note that the transmission mode setting method is an example of a transmission parameter setting method.

The filter setting unit 271 acquires the transmission line information from the NW-DB 80 (step St1). In the NW-DB 80, for example, the transmission line information is registered from a network management device (not illustrated).

Next, the filter setting unit 271 calculates the difference narrowing amount on the basis of the transmission line information, calculates the transmission characteristic of filtering of the electric field signals Xi, Xq, Yi, and Yq according to the difference narrowing amount, and sets the transmission characteristic in the band narrowing filter 270 (step St2). Thereby, the band narrowing filter 270 is set to provide the deterioration amount of the Q value corresponding to the difference narrowing amount in a pseudo manner to the electric field signals Xi, Xq, Yi, and Yq.

Next, the mode setting unit 273 selects one transmission mode #i (i=1, 2, . . . , or 6) from the transmission modes #1 to #6 and sets the transmission mode in the reception processing circuit 20, the demodulation processing unit 272, and the transmission processing circuit 10 (step St3). At this time, the mode setting unit 273 sets the selected transmission mode #i in the transmission processing circuit 10 by transmitting the mode information from the communication unit 274 to the transmission-side TP 1. In the transmission-side TP 1, as described above, the communication unit 16 receives the mode information from the TP 2, and the mode setting unit 273 sets the transmission mode indicated by the mode information in the transmission processing circuit 10.

Next, the optical reception unit 29 receives the optical signal (step St4). Next, the ADCs 22$a$ to 22$d$ convert the optical signal into the electric field signals Xi, Xq, Yi, and Yq (step St5).

Next, the band narrowing filter 270 filters the electric field signals Xi, Xq, Yi, and Yq (step St6). As a result, the deterioration amount of the Q value corresponding to the difference narrowing amount in a pseudo manner is provided to the electric field signals Xi, Xq, Yi, and Yq.

Next, the demodulation processing unit 272 demodulates the electric field signals Xi, Xq, Yi, and Yq to restore the data signal (step St7). Next, the mode setting unit 273 calculates the Q value of the electric field signals Xi, Xq, Yi, and Yq from the error rate of the data signal (step St8).

Next, the mode setting unit 273 determines transmission availability of the selected transmission mode #i on the basis of the Q value (step St9). Note that the transmission availability determination processing will be described below.

Next, the mode setting unit 273 determines the presence or absence of unselected transmission modes #1 to #6 (step St10). In the case where there is an unselected transmission mode #1 to #6 (Yes of step St10), another transmission mode #1 to #6 is selected in the processing of step St3, and each processing of step St4 and the subsequent steps is executed again.

Furthermore, in the case where there is no unselected transmission mode #1 to #6 (No of step St10), the mode setting unit 273 selects the transmission mode having the maximum transmission rate from the transmission modes #1 to #6 determined to be transmissible, and sets the transmission mode in the reception processing circuit 20, the demodulation processing unit 272, and the transmission processing circuit 10 (step St11). At this time, the mode setting unit 273 transmits the mode determination notification indicating the selected transmission mode #1 to #6 from the communication unit 274 to the transmission-side TP 1. In this way, the transmission mode setting method is executed.

Figure 8:
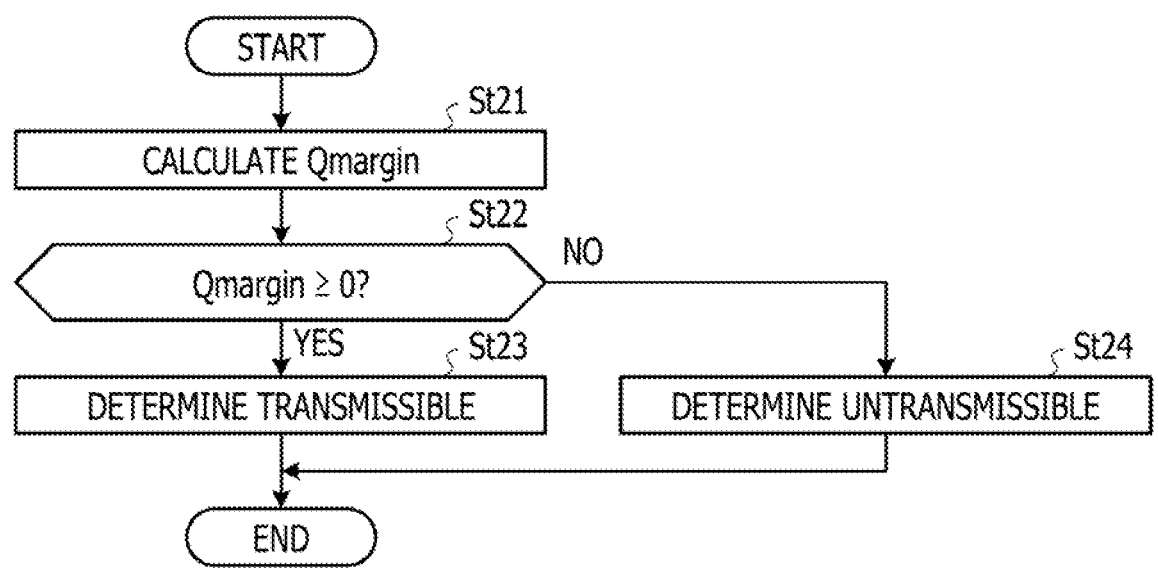
FIG. 8 is a flowchart illustrating an example of transmission mode transmission availability determination processing.

FIG. 8 is a flowchart illustrating an example of transmission availability determination processing for the transmission modes #1 to #6. This processing is executed in step St9 above.

The mode setting unit 273 calculates the quality margin amount Qmargin from the Q value and the error correction threshold value Qlimit (step St21). Next, the mode setting unit 273 determines the result of Qmargin ≥0 (step St22).

In the case where Qmargin ≥0 is satisfied (Yes of step St22), the mode setting unit 273 determines the selected transmission mode #i to be transmissible (step St23). In the case where Qmargin<0 is satisfied (No of step St22), the mode setting unit 273 determines the selected transmission mode #i to be untransmissible (step St24). In this way, the transmission availability determination processing for the transmission modes #1 to #6 is executed.

As described above, the TP 2 has the optical reception unit 29, the band narrowing filter 270, the filter setting unit 271, and the mode setting unit 273. The optical reception unit 29 receives the optical signal from the TP 1 via the transmission line 9. The filter setting unit 271 calculates the transmission characteristic of the filtering of the electric field signals Xi, Xq, Yi, and Yq on the basis of the narrowing amount of the wavelength band of the optical signal transmitted through the transmission line 9 and the narrowing amount of the wavelength band of when the state of the transmission line 9 is changed, on the basis of the transmission line information regarding the transmission line 9, and sets the transmission characteristic in the band narrowing filter 270. The mode setting unit 273 sets the transmission mode of the optical signal according to the Q value of the electric field signals Xi, Xq, Yi, and Yq filtered by the band narrowing filter 270, that is, the transmission parameter.

According to this configuration, the band narrowing filter 270 can provide the deterioration amount of the future Q value corresponding to the difference narrowing amount with high accuracy in a pseudo manner to the electric field signals Xi, Xq, Yi, and Yq. Therefore, the mode setting unit 273 can set a more appropriate transmission mode than the case of setting the transmission mode from the narrowing amount based on the design values of the optical components or the like.

Therefore, the TP 2 can transmit the optical signal with appropriate transmission parameters according to the band narrowing of the optical signal in the future.

Second Embodiment

Figure 9:
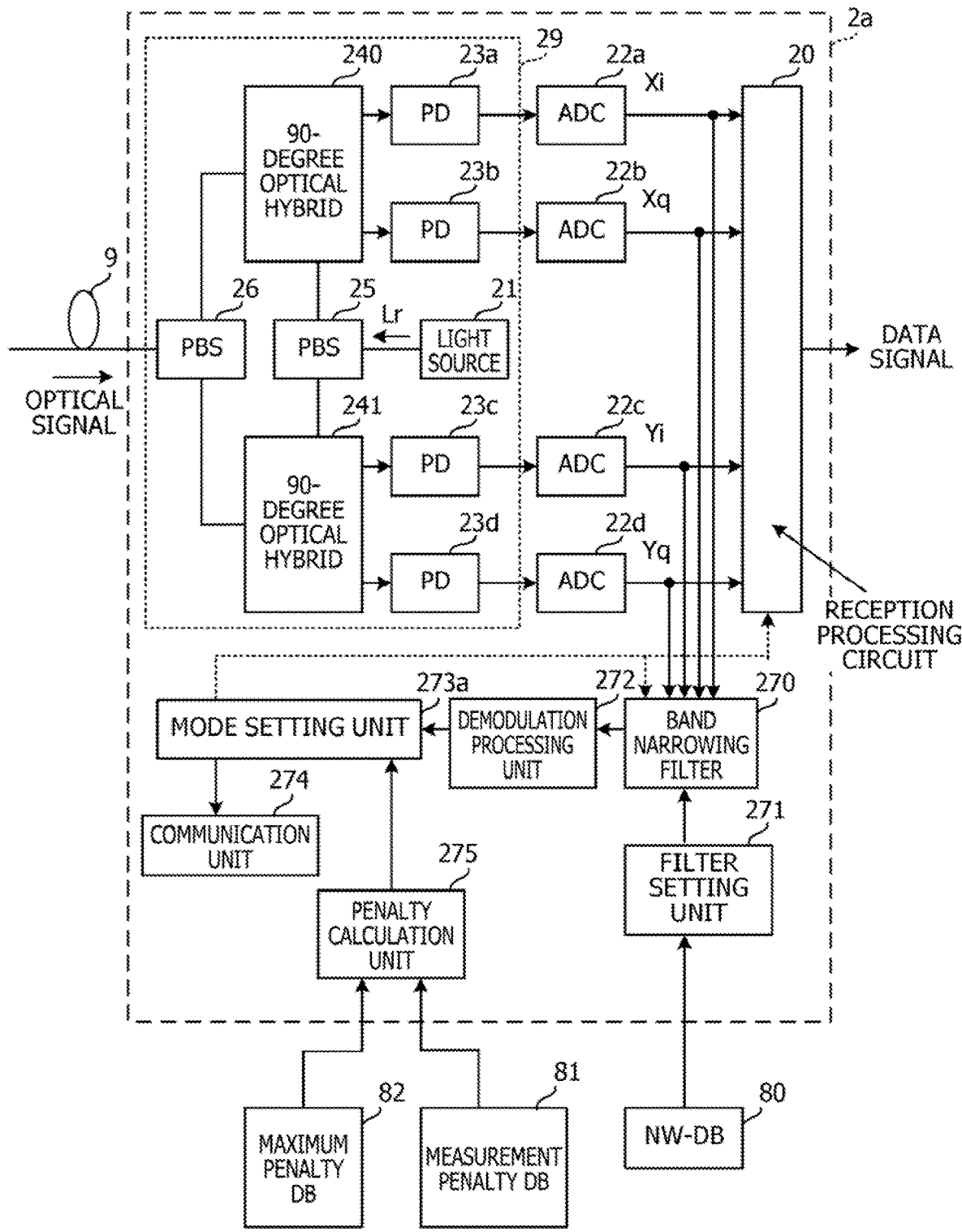
FIG. 9 is a configuration diagram illustrating a transponder according to a second embodiment.

FIG. 9 is a configuration diagram illustrating a TP 2a of a second embodiment. In FIG. 9, the same components as those in FIG. 4 are denoted by the same codes, and description thereof will be omitted.

The TP 2a includes a reception processing circuit 20, a light source 21, ADCs 22a to 22d, an optical reception unit 29, a band narrowing filter 270, a filter setting unit 271, a demodulation processing unit 272, a mode setting unit 273a, a communication unit 274, and a penalty calculation unit 275.

After the installation of TP 2a, the penalty calculation unit 275 calculates an OSNR, non-linear distortion, polarization-dependent loss, polarization mode dispersion, and polarization rotation of an optical signal, and a deterioration amount of a future Q value due to crosstalk between the optical signal and another optical signal (for example, an optical signal of an adjacent channel). That is, the penalty calculation unit 275 calculates the deterioration amount of the future Q value due to factors other than band narrowing of the optical signal.

The penalty calculation unit 275 accesses a maximum penalty database (DB) 82 and a measurement penalty database (DB) 81 outside the TP 2a. In the maximum penalty DB 82, the OSNR, the non-linear distortion, the polarization-dependent loss, the polarization mode dispersion, and the polarization rotation of the optical signal, and the maximum value of the deterioration amount of the future Q value due to crosstalk between the optical signal and another optical signal in the case of assuming a worst state of a transmission line 9 are registered. Here, a predetermined value less than the maximum value may be registered in the maximum penalty DB 82 instead of the maximum value of the deterioration amount of the Q value.

Furthermore, in the measurement penalty DB 81, the OSNR, the non-linear distortion, the polarization-dependent loss, the polarization mode dispersion, and the polarization rotation of the optical signal, and the measurement value of the deterioration amount of the Q value due to crosstalk between the optical signal and another optical signal at the installation of the TP 2a are registered. Note that the maximum penalty DB 82 and the measurement penalty DB 81 may be provided in the TP 2a.

$$Qpe\_future = Qpe\_worst - Qpe\_now \quad (1)$$

The penalty calculation unit 275 acquires a maximum value Qpe_worst of the deterioration amount of the Q value from the maximum penalty DB 82, and acquires a measurement value Qpe_now of the deterioration amount of the Q value from the measurement penalty DB 81. The penalty calculation unit 275 calculates a deterioration amount Qpe_future of the future Q value due to factors other than band narrowing from the above equation (1) using the measurement value Qpe_now and the maximum value Qpe_worst of the deterioration amount of the Q value.

$$Qpe\_future = (QNLpe\_worst - QNLpe\_now) + \\ (QOSNRpe\_worst - QOSNRpe\_now) + (QPDLpe\_worst - QPDLpe\_now) + (QPMDpe\_worst - QPMDpe\_now) + (QXTpe\_worst - QXTpe\_now) + \\ (QSOPpe\_worst - QSOPpe\_now) \quad (2)$$

More specifically, the penalty calculation unit 275 calculates the deterioration amount Qpe_future of the future Q value due to factors other than the band narrowing from the above equation (2). In the equation (2), QNLpe_worst and QNLpe_now are the maximum value and the measurement value of the deterioration amount of the Q value due to the non-linear distortion of the optical signal, respectively, and QOSNRpe_worst and QOSNRpe_now are the maximum value and the measurement value of the deterioration amount of the Q value due to the optical signal to noise ratio (OSNR) of the optical signal, respectively.

Furthermore, QPDLpe_worst and QPDLpe_now are the maximum value and the measurement value of the deterioration amount of the Q value due to the polarization-dependent loss of the optical signal, respectively, and QPMDpe_worst and QPMDpe_now are the maximum value and the measurement value of the deterioration amount of the Q value due to the polarization mode dispersion of the optical signal, respectively. Furthermore, QXTpe_worst and QXTpe_now are the maximum value and the measurement value of the deterioration amount of the Q value due to the crosstalk between the optical signal and another optical signal, respectively, and QSOPpe_worst and QSOPpe_now are the maximum value and the measurement value of the deterioration amount of the Q value due to the polarization rotation of the optical signal, respectively.

The penalty calculation unit 275 outputs the deterioration amount Qpe_future of the Q value to the mode setting unit 273a. Note that the penalty calculation unit 275 is only needed to calculate the deterioration amount Qpe_future of the Q value using the measurement value Qpe_now and the maximum value Qpe_worst of the deterioration amount of the Q value due to at least one of the OSNR, the non-linear distortion, the polarization-dependent loss, the polarization mode dispersion, the polarization rotation of the optical signal, or the crosstalk between the optical signal and another optical signal.

$$Q\text{margin} = Q\text{ value} - Q\text{limit} - Q\text{pe\_future} \tag{3}$$

The mode setting unit 273a calculates the quality margin amount Qmargin by subtracting the error correction threshold value Qlimit and the deterioration amount Qpe_future of the future Q value from the Q value according to the above equation (3). As described above, the mode setting unit 273a determines that the transmission mode satisfying Qmargin ≥0 is transmittable, and determines that the transmission mode satisfying Qmargin <0 is untransmittable.

Figure 10:
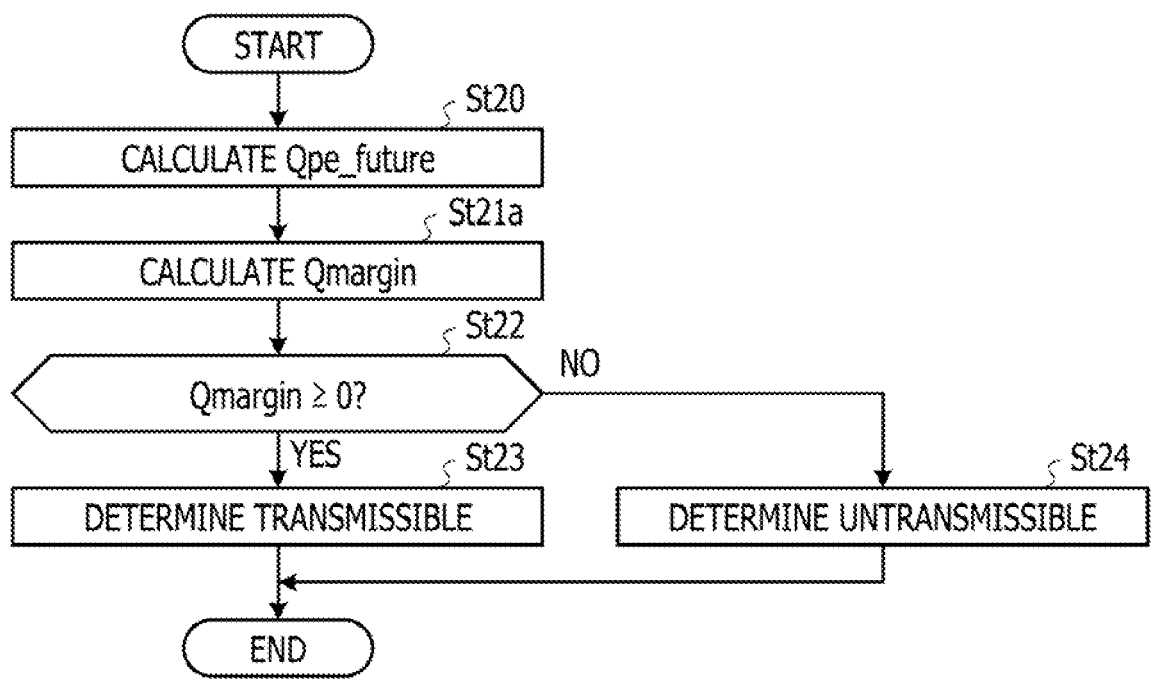
FIG. 10 is a flowchart illustrating another example of transmission mode transmission availability determination processing.

FIG. 10 is a flowchart illustrating another example of the transmission availability determination processing for the transmission modes #1 to #6. This processing is executed in step St9 above. Note that, in FIG. 10, processing common to that in FIG. 8 is denoted by the same code, and descriptions thereof will be omitted.

The penalty calculation unit 275 acquires the measurement value Qpe_now and the maximum value Qpe_worst of the deterioration amount of the Q value from the maximum penalty DB 82 and the measurement penalty DB 81, and calculates the deterioration amount Qpe_future of the Q value (step St20). Next, the mode setting unit 273a calculates the quality margin amount Qmargin according to the above equation (3) (step St21a).

As described above, the mode setting unit 273a sets a transmission mode, that is, a transmission parameter, on the basis of a comparison result between the Q value and a difference of the measurement value Qpe_now from the maximum value Qpe_worst of the deterioration amount of the Q value due to at least one of the OSNR, the non-linear distortion, the polarization-dependent loss, the polarization mode dispersion, the polarization rotation of the optical signal transmitted through the transmission line 9, or the crosstalk between the optical signal and another optical signal. Therefore, the TP 2a can select a more appropriate transmission rate in consideration of the deterioration amount Qpe_future of the future Q value due to factors other than band narrowing. Note that the mode setting unit 273a may set the transmission mode on the basis of a comparison result between the Q value and a difference of the measurement value Qpe_now of the deterioration amount from a predetermined value less than the maximum value Qpe_worst.

Third Embodiment

In the first and second embodiments, the band narrowing filter 270 is provided on the reception-side TP 2. However, for example, in the case where the band narrowing of the optical signal occurs at a node on the transmission line 9 near the transmission-side TP 1, the band narrowing filter 270 may be provided on the transmission-side TP 1 in order to enhance the accuracy of the band narrowing caused by the band narrowing filter.

Figure 11:
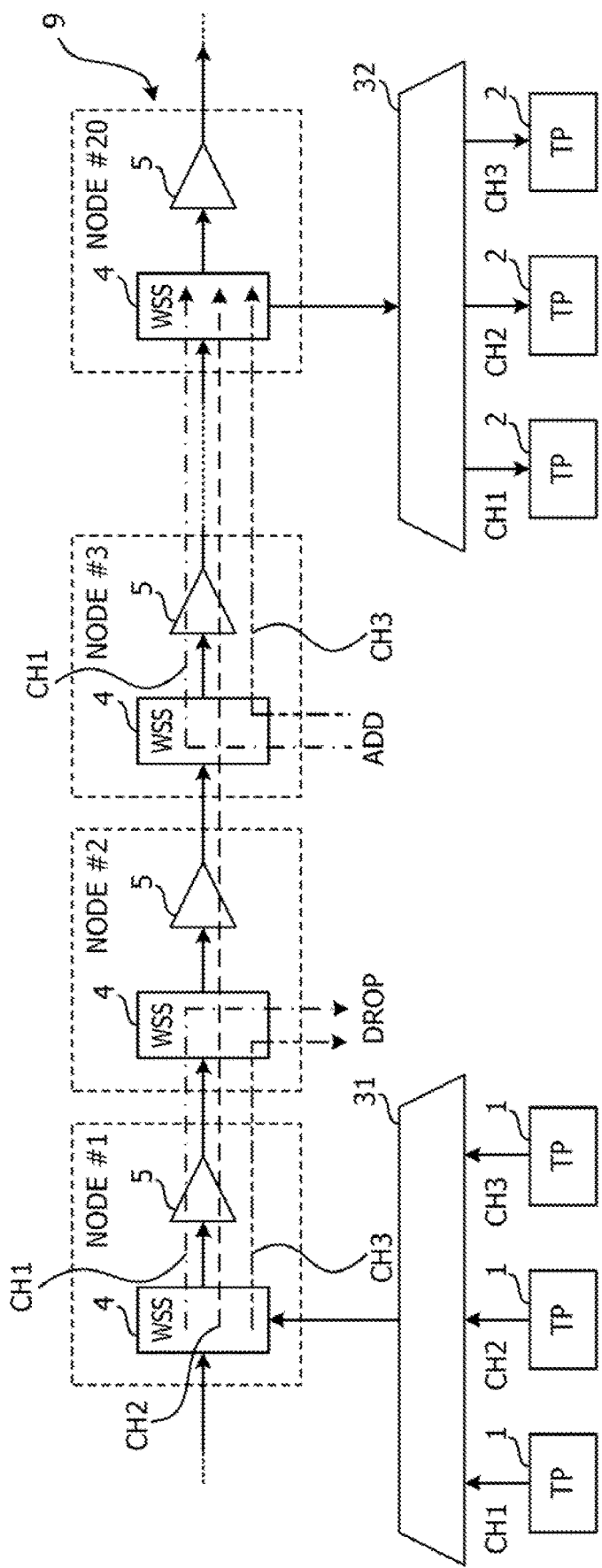
FIG. 11 is a diagram illustrating an example in which band narrowing of an optical signal occurs at a node on a transmission line 9 near a transmission-side transponder.

FIG. 11 is a diagram illustrating an example in which band narrowing of an optical signal occurs at a node on a transmission line 9 near a transmission-side TP 1. In FIG. 11, the same components as those in FIG. 2 are denoted by the same codes, and description thereof will be omitted.

The transmission-side TP 1 is connected to node #1 on the transmission line 9, and a reception-side TP 2 is connected to node #20 on the transmission line 9. An optical signal of CH2 is transmitted from the TP 1, passes through the nodes #1 to #20, and is received by the TP 2. Furthermore, optical signals of CH1 and CH3 are branched (DROP) at the node #2 and inserted (ADD) at the node #3.

In this case, band narrowing occurs in the optical signal of CH2 at the nodes #2 and #3 near the transmission-side TP 1. Therefore, pseudo band narrowing can be generated with high accuracy by providing a band narrowing filter at the transmission-side TP 1 of the optical signal of CH2.

Figure 12:
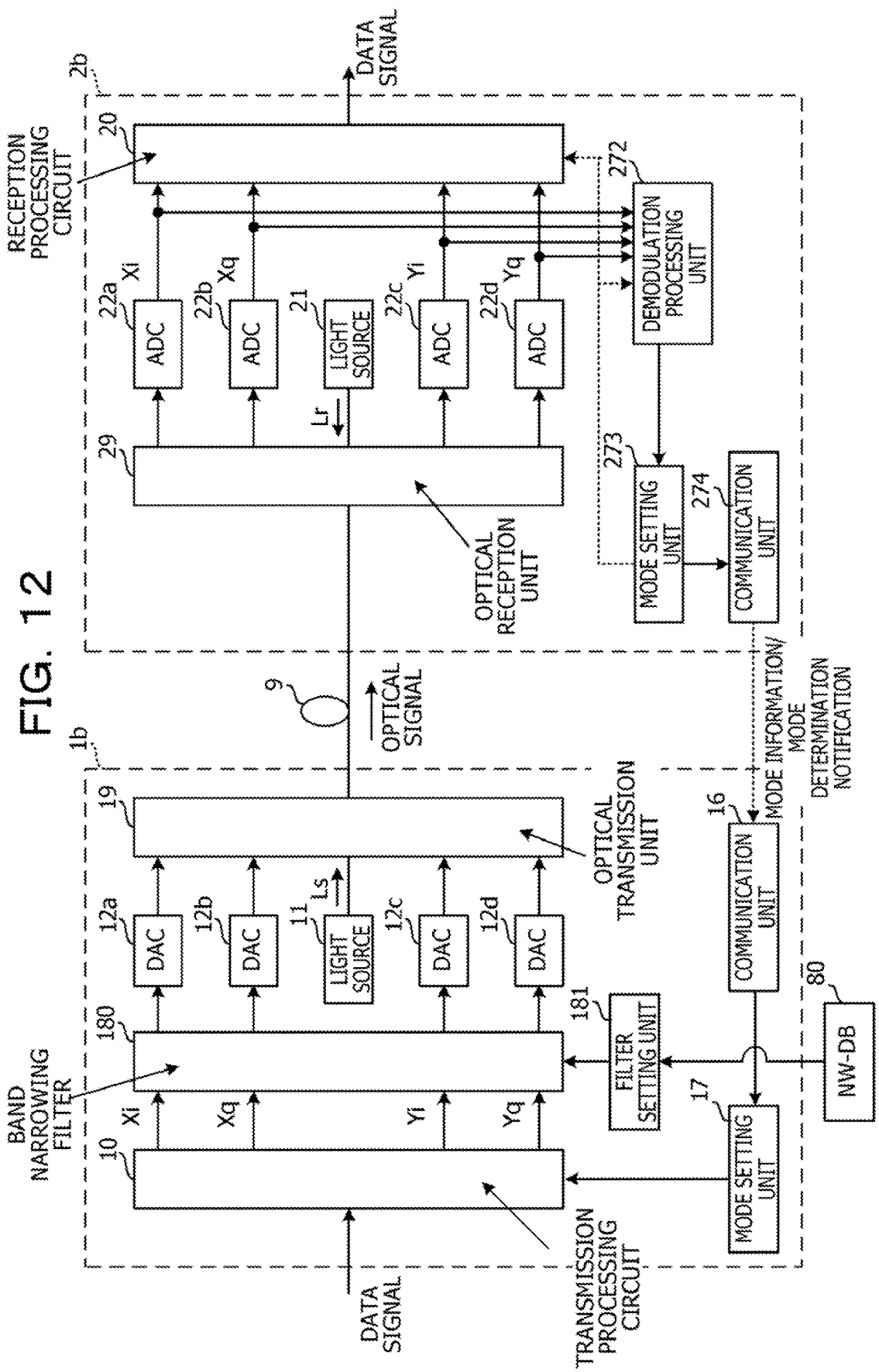
FIG. 12 is a configuration diagram illustrating a transponder according to a third embodiment.

FIG. 12 is a configuration diagram illustrating TPs 1b and 2b of the third embodiment. In FIG. 12, the same components as those in FIG. 4 are denoted by the same codes, and description thereof will be omitted.

The transmission-side TP 1b includes a transmission processing circuit 10, a light source 11, DACs 12a to 12d, a mode setting unit 17, a communication unit 16, an optical transmission unit 19, a band narrowing filter 180, and a filter setting unit 181. The optical transmission unit 19 is an example of a transmission/reception unit that transmits an optical signal to a reception-side TP 2b via a transmission line 9.

The filter setting unit 181 acquires transmission line information from an NW-DB 80, similarly to the filter setting unit 271, calculates a difference narrowing amount on the basis of the transmission line information, calculates a transmission characteristic of filtering of electric field signals Xi, Xq, Yi, and Yq according to the difference narrowing amount, and sets the transmission characteristic in the band narrowing filter 180. The filter setting unit 181 may be implemented by a circuit such as a DSP, an FPGA, or an ASIC, or may be implemented as functions of a processor such as a CPU that operates by a program. Furthermore, the NW-DB 80 may be provided in the TP 1b.

The band narrowing filter 180 is connected between the transmission processing circuit 10 and the DACs 12a to 12d. The band narrowing filter 180 is an example of a filter and filters the electric field signals Xi, Xq, Yi, and Yq, similarly to the band narrowing filter 270. The band narrowing filter 180 has filtering characteristics set by the filter setting unit 181, and functions as an emulator that pseudo-generates future band narrowing for the electric field signals Xi, Xq, Yi, and Yq.

The reception-side TP 2b includes a reception processing circuit 20, a light source 21, ADCs 22a to 22d, an optical reception unit 29, a demodulation processing unit 272, a mode setting unit 273, and a communication unit 274.

The TP 2b does not have a band narrowing filter 270. Therefore, the electric field signals Xi, Xq, Yi, and Yq are directly input to the demodulation processing unit 272 from the ADCs 22a to 22d.

Figure 13:
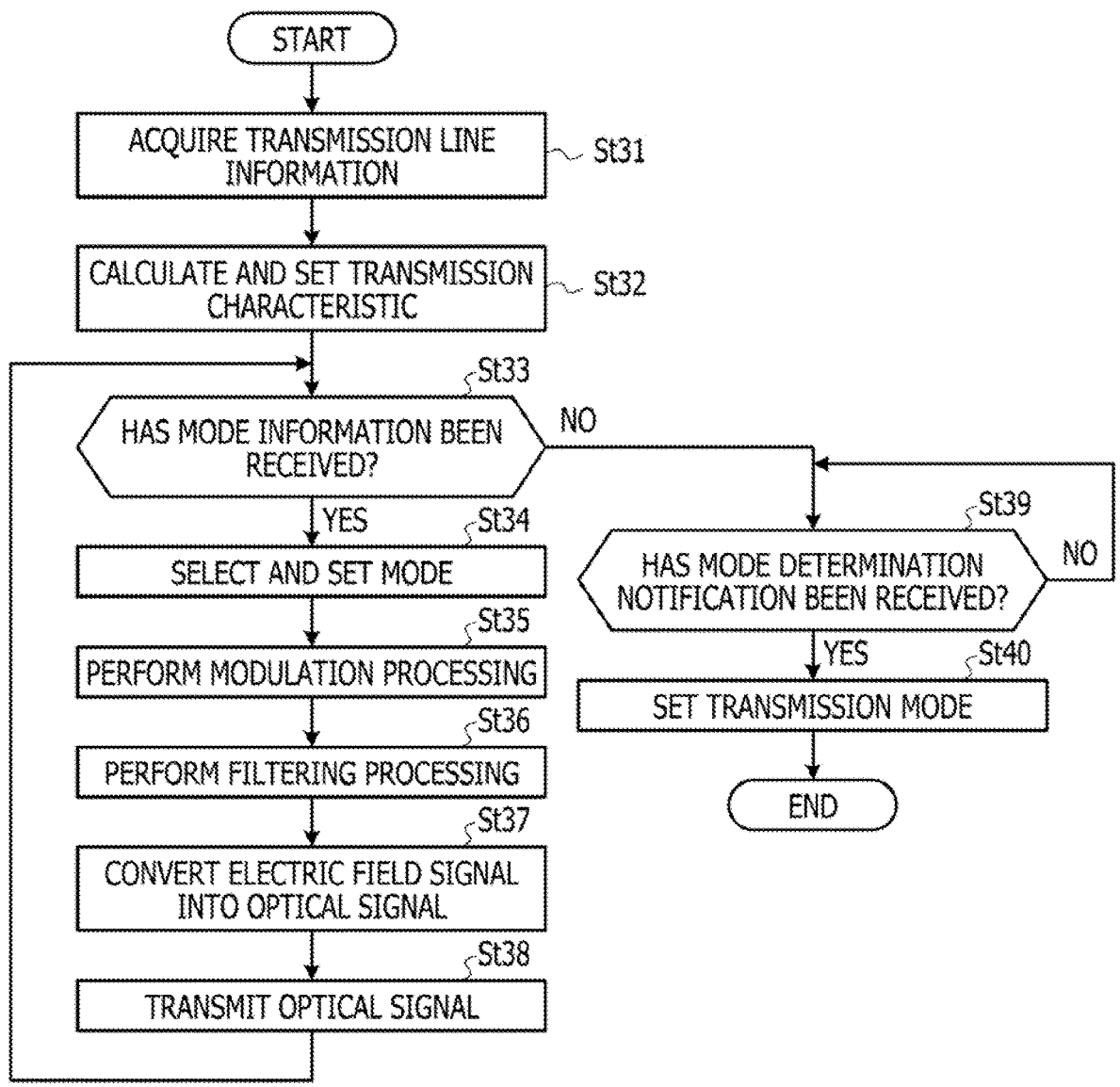
FIG. 13 is a flowchart illustrating a method of setting a transmission parameter of the third embodiment.

FIG. 13 is a flowchart illustrating a method of setting a transmission mode of the third embodiment. The transmission mode setting method is executed by the TP 1b at the installation of the device, for example, but is not limited to the case, and may be executed at the time of resetting of the transmission modes #1 to #6 with the change in the transmission line 9, for example.

The filter setting unit 271 acquires the transmission line information from the NW-DB 80 (step St31). Next, the filter setting unit 271 calculates the difference narrowing amount on the basis of the transmission line information, calculates the transmission characteristic of filtering of the electric field signals Xi, Xq, Yi, and Yq according to the difference narrowing amount, and sets the transmission characteristic in the band narrowing filter 180 (step St32). Thereby, the band narrowing filter 180 is set to provide the deterioration amount of the Q value corresponding to the difference narrowing amount in a pseudo manner to the electric field signals Xi, Xq, Yi, and Yq.

Next, the mode setting unit 17 determines whether having received the mode information from the transmission-side TP 1b (step St33). In the case where the mode setting unit 17 receives the mode information (Yes in step St33), the mode setting unit 17 selects the transmission mode #1 to #6 according to the mode information and sets the transmission mode in the transmission processing circuit 10 (step St34). Note that the mode setting unit 17 is an example of a parameter setting unit.

Next, the transmission processing circuit 10 symbol-maps a data signal and performs modulation processing (step St35). As a result, the data signal is converted into the electric field signals Xi, Xq, Yi, and Yq.

Next, the band narrowing filter 180 filters the electric field signals Xi, Xq, Yi, and Yq (step St36). As a result, a deterioration amount of a Q value according to a future difference narrowing amount is provided to the electric field signals Xi, Xq, Yi, and Yq.

Next, the optical transmission unit 19 converts the electric field signal into an optical signal (step St37). Next, the optical transmission unit 19 transmits the optical signal to the reception-side TP 2b via the transmission line 9 (step St38).

Furthermore, in the case where the mode setting unit 17 has not received the mode information (No in step St33), the mode setting unit 17 determines whether having received a mode determination notification (step St39). In the case of not having received the mode determination notification (No in step St39), the processing in step St39 is executed again.

Furthermore, in the case of having received the mode determination notification (Yes in step St39), the mode setting unit 17 sets the transmission mode #1 to #6 indicated by the mode determination notification in the transmission processing circuit 10 (step St40). That is, the mode setting unit 17 sets the transmission mode of the optical signal according to the Q value of the electric field signals Xi, Xq, Yi, and Yq filtered by the band narrowing filter 180. In this way, the TP 1b executes the transmission mode setting method.

In the present example, unlike the first embodiment, the band narrowing filter 180 is provided on the transmission-side TP 1b instead of the reception-side TP 2b. Therefore, not only can an appropriate transmission mode be set as in the first embodiment, but also when the band narrowing occurs at the nodes #2 and #3 on the transmission line 9 near the transmission-side TP 1b, the band narrowing can be generated by the band narrowing filter 180 with high accuracy in a pseudo manner.

Fourth Embodiment

For example, in a case where band narrowing of an optical signal occurs at both a node on a transmission line 9 near a transmission-side TP 1 and a node on the transmission line 9 near a reception-side TP 2, band narrowing filters 180 and 270 may be provided at both the transmission-side TP 1 and the reception-side TP 2.

Figure 14:
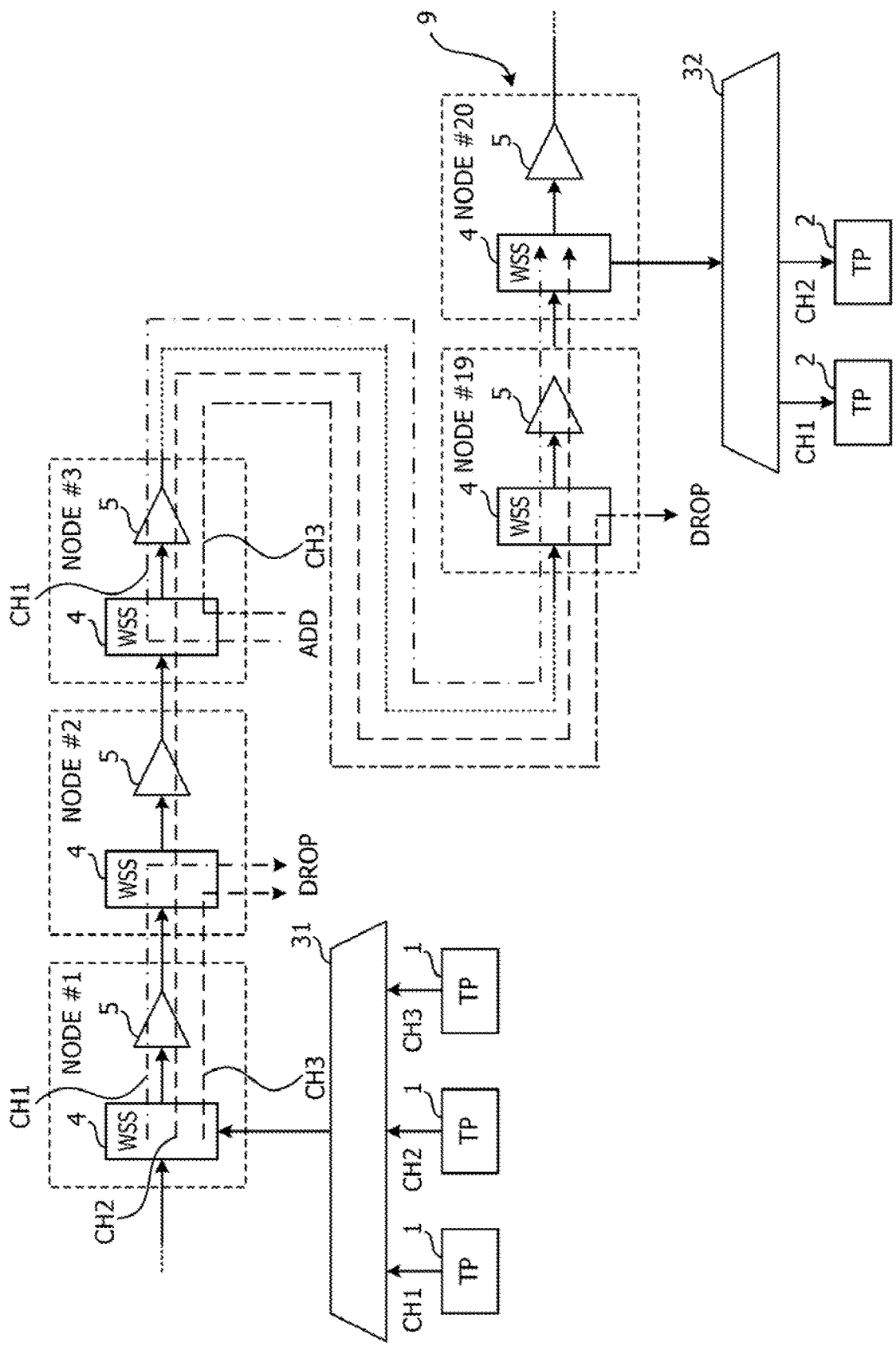
FIG. 14 is a diagram illustrating an example in which band narrowing of an optical signal occurs at a node on a transmission line near a transmission-side transponder and a reception-side transponder.

FIG. 14 is a diagram illustrating an example in which band narrowing of an optical signal occurs at nodes on the transmission line 9 near the transmission-side TP 1 and the reception-side TP 2. In FIG. 14, the same components as those in FIG. 11 are denoted by the same codes, and description thereof will be omitted.

The transmission-side TPs 1 of CH1 to CH 3 are connected to the node #1 on the transmission line 9, and the reception-side TPs 2 of CH1 and CH2 are connected to the node #1 on the transmission line 9. An optical signal of CH2 is transmitted from the TP 1, passes through the nodes #1 to #20, and is received by the TP 2. Furthermore, optical signals of CH1 and CH3 are branched (DROP) at the node #2 and inserted (ADD) at the node #3. Furthermore, the optical signal of CH3 is branched (DROP) at the node #19.

In this case, band narrowing occurs at the nodes #2 and #3 near the transmission-side TP 1 and band narrowing also occurs at the node #19 near the reception-side TP2, in the optical signal of CH2. Therefore, by providing the band narrowing filters 180 and 270 on the transmission-side TP 1 and the reception-side TP 2 of the optical signal of CH2, respectively, the difference narrowing amount is shared by the band narrowing filters 180 and 270, and the pseudo band narrowing can be generated with high accuracy.

Figure 15:
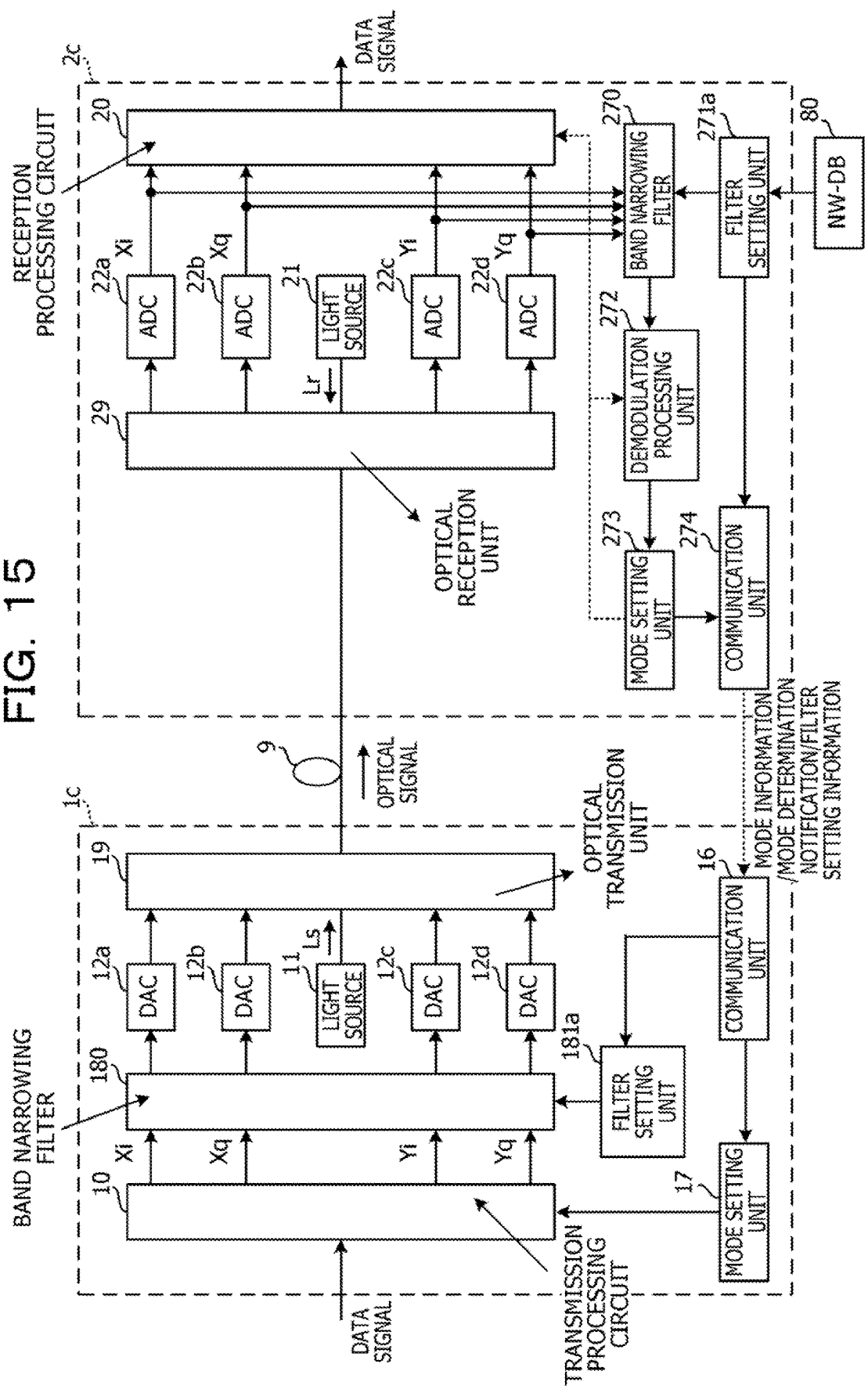
FIG. 15 is a configuration diagram illustrating a transponder according to a fourth embodiment.

FIG. 15 is a configuration diagram illustrating TPs 1c and 2c of a fourth embodiment. In FIG. 15, the same components as those in FIGS. 4 and 12 are denoted by the same codes, and description thereof will be omitted.

The transmission-side TP 1c is an example of a transmitting device, and includes a transmission processing circuit 10, a light source 11, DACs 12a to 12d, a mode setting unit 17, a communication unit 16, an optical transmission unit 19, a band narrowing filter 180, and a filter setting unit 181a. Furthermore, the reception-side TP 2c includes a reception processing circuit 20, a light source 21, ADCs 22a to 22d, an optical reception unit 29, a band narrowing filter 270, a filter setting unit 271a, a demodulation processing unit 272, a mode setting unit 273, and a communication unit 274.

The filter setting unit 271a acquires transmission line information from an NW-DB 80 and calculates a difference narrowing amount on the basis of the transmission line information, similarly to the first embodiment. The filter setting unit 271a further assigns the difference narrowing amount to the reception-side band narrowing filter 270 and the transmission-side band narrowing filter 180. As an example, the filter setting unit 271a may assign the difference narrowing amount to the band narrowing filters 270 and 180 on the basis of a ratio of the number of nodes in which the band narrowing occurs near the transmission-side TP 1c and the number of nodes in which the band narrowing occurs near the reception-side TP 2c, of the nodes #1 to #20 on the transmission line 9, for example.

The filter setting unit 271a calculates a transmission characteristic of filtering according to each of the difference narrowing amounts assigned to the reception-side band narrowing filter 270 and the transmission-side band narrowing filter 180. The filter setting unit 271a transmits filter setting information indicating the transmission characteristic of filtering according to the difference narrowing amount assigned to the reception-side band narrowing filter 270 from the communication unit 274 to the transmission-side TP 1c. The communication unit 16 of the TP 1c outputs the filter setting information to the filter setting unit 181a.

The filter setting unit 271*a* sets the transmission characteristic of filtering according to the difference narrowing amount assigned to the reception-side band narrowing filter 270 to the band narrowing filter 270. The filter setting unit 181*a* sets the transmission characteristic of filtering indicated by the filter setting information in the band narrowing filter 180. That is, the filter setting unit 271*a* sets the transmission characteristic of filtering to the band narrowing filter 180 by transmitting the filter setting information to the filter setting unit 181*a*. As a result, a deterioration amount of a Q value according to the difference narrowing amount is shared between the reception-side band narrowing filter 270 and the transmission-side band narrowing filter 180 and is provided to electric field signals Xi, Xq, Yi, and Yq.

In this way, the filter setting unit 271*a* calculates the transmission characteristic of filtering of the electric field signals Xi, Xq, Yi, and Yq according to a part of the difference narrowing amount, and sets the transmission characteristic in the band narrowing filter 270. Furthermore, the filter setting unit 271*a* calculates the transmission characteristic of filtering of the electric field signals Xi, Xq, Yi, and Yq according to the remaining difference narrowing amount, and sets the transmission characteristic in the band narrowing filter 180. Note that the band narrowing filter 180 is an example of another filter that filters the electric field signal.

Therefore, not only can an appropriate transmission mode be set as in the first embodiment, but also when the band narrowing occurs at both the nodes #2 and #3 on the transmission line 9 near the transmission-side TP 1*c*, and the node #19 near the reception-side TP 2*c*, the band narrowing can be generated by the band narrowing filter 180 with high accuracy in a pseudo manner.

The embodiment described above is an example of a preferred embodiment. However, they are not limited thereto, and a variety of modifications may be made without departing from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission system comprising:

a memory; and a processor coupled to the memory and configured to:

transmit or receive an optical signal;

filter an electrical electric field signal that indicates electric field information of the optical signal using a filter;

calculate a difference between a narrowing amount of a wavelength band of the optical signal transmitted through a transmission line and a narrowing amount of the wavelength band when a state of the transmission line is changed based on transmission line information regarding the transmission line of the optical signal;

calculate a transmission characteristic of filtering of the electric field signal based on the difference;

set the transmission characteristic to the filter; and set a transmission parameter of the optical signal according to quality of the electric field signal filtered by the filter to which the transmission characteristic is set.

2. The transmission system according to claim 1, wherein the transmission line information includes a number of wavelength selective switches on the transmission line, and a parameter of a transmission characteristic of filtering of the optical signal by the wavelength selective switches.

3. The transmission system according to claim 1, wherein the processor receives the optical signal via the transmission line from a transmitting device, and calculates a transmission characteristic of filtering of the electric field signal according to a part of the difference between the narrowing amount of the wavelength band of the optical signal transmitted through the transmission line and the narrowing amount of the wavelength band when the state of the transmission line is changed and sets the transmission characteristic in the filter, and calculates a transmission characteristic of filtering of the electric field signal according to a rest of the difference and sets the transmission characteristic in another filter that filters the electric field signal.

4. The transmission system according to claim 1, wherein the processor selects a candidate that has a maximum transmission rate of the optical signal among a plurality of candidates for the transmission parameter that satisfies a predetermined condition regarding the quality of the electric field signal.

5. The transmission system according to claim 1, wherein the processor sets the transmission parameter on a basis of a comparison result between the quality of the electric field signal and a deterioration amount of the quality of the electric field signal due to a limit of error correction of the electric field signal.

6. The transmission system according to claim 1, wherein the processor sets the transmission parameter on a basis of a comparison result between the quality of the electric field signal, and a difference of a measurement value of a deterioration amount of the quality of the electric field signal from a predetermined value due to at least one of an OSNR, non-linear distortion, polarization-dependent loss, polarization mode dispersion, or polarization rotation of the optical signal transmitted through the transmission line, or a crosstalk between the optical signal and another optical signal.

7. The transmission device according to claim 1, wherein the processor receives the optical signal via the transmission line from another transmitting device including another filter, assigns a part of the difference to the filter, assigns a rest of the difference to the another filter and calculates the transmission characteristic in the filter and the another filter based on the part of the deterrence and the rest of the deference, respectively.

8. A method of setting a transmission parameter comprising:

transmitting or receive an optical signal;

filtering an electrical electric field signal that indicates electric field information of the optical signal;

calculating a difference between a narrowing amount of a wavelength band of the optical signal transmitted through a transmission line and a narrowing amount of the wavelength band when a state of the transmission line is changed based on transmission line information regarding the transmission line of the optical signal;

calculating a transmission characteristic of filtering of the electric field signal based on the difference;

setting the transmission characteristic to the filter; and setting the transmission parameter of the optical signal according to quality of the electric field signal filtered by the filter to which the transmission characteristic is set.

9. The method according to claim 8, wherein the transmission line information includes a number of wavelength selective switches on the transmission line, and a parameter of a transmission characteristic of filtering of the optical signal by the wavelength selective switches.

10. The method according to claim 8, further comprising:

receiving the optical signal via the transmission line from a transmitting device;

calculating a transmission characteristic of filtering of the electric field signal according to a part of the difference between the narrowing amount of the wavelength band of the optical signal transmitted through the transmission line and the narrowing amount of the wavelength band when the state of the transmission line is changed and sets the transmission characteristic in the filter;

calculating a transmission characteristic of filtering of the electric field signal according to a rest of the difference; and setting the transmission characteristic in another filter that filters the electric field signal.

11. The method according to claim 8, further comprising:

selecting a candidate that has a maximum transmission rate of the optical signal among a plurality of candidates for the transmission parameter that satisfies a predetermined condition regarding the quality of the electric field signal.

12. The method according to claim 8, further comprising:

setting the transmission parameter on a basis of a comparison result between the quality of the electric field signal and a deterioration amount of the quality of the electric field signal due to a limit of error correction of the electric field signal.

13. The method according to claim 8, further comprising:

setting the transmission parameter on a basis of a comparison result between the quality of the electric field signal, and a difference of a measurement value of a deterioration amount of the quality of the electric field signal from a predetermined value due to at least one of an OSNR, non-linear distortion, polarization-dependent loss, polarization mode dispersion, or polarization rotation of the optical signal transmitted through the transmission line, or a crosstalk between the optical signal and another optical signal.

14. The method according to claim 8, further comprising:

receiving the optical signal via the transmission line from another transmitting device including another filter;

assigning to a part of the difference to the filter, assigning a rest of the difference to the another filter; and calculating the transmission characteristic in the filter and the another filter based on the part of the deterrence and the rest of the deference, respectively.

* * * * *